(12) United States Patent
Balasubramanian et al.

(10) Patent No.: US 11,425,691 B2
(45) Date of Patent: Aug. 23, 2022

(54) PHYSICAL SIDELINK FEEDBACK CHANNEL (PSFCH) NEGOTIATION

(71) Applicant: QUALCOMM INCORPORATED, San Diego, CA (US)

(72) Inventors: Anantharaman Balasubramanian, San Diego, CA (US); Sudhir Kumar Baghel, Hillsborough, NJ (US); Kapil Gulati, Montgomery, NJ (US); Shuanshuan Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/061,402

(22) Filed: Oct. 1, 2020

(65) Prior Publication Data

US 2021/0105744 A1    Apr. 8, 2021

Related U.S. Application Data

(60) Provisional application No. 62/911,033, filed on Oct. 4, 2019.

(51) Int. Cl.
*H04W 72/02* (2009.01)
*H04W 72/10* (2009.01)
(Continued)

(52) U.S. Cl.
CPC ....... *H04W 72/02* (2013.01); *H04W 72/0453* (2013.01); *H04W 72/0473* (2013.01);
(Continued)

(58) Field of Classification Search
None
See application file for complete search history.

(56) References Cited

U.S. PATENT DOCUMENTS

| 2020/0205165 A1* | 6/2020 | Huang | H04W 76/14 |
| 2020/0313825 A1* | 10/2020 | Ryu | H04L 5/0055 |

(Continued)

FOREIGN PATENT DOCUMENTS

WO    2019174746 A1    9/2019

OTHER PUBLICATIONS

International Search Report and Written Opinion—PCT/US2020/054156—ISA/EPO—dated Feb. 3, 2021.

*Primary Examiner* — Mohammad S Adhami
(74) *Attorney, Agent, or Firm* — Haynes and Boone, LLP

(57) ABSTRACT

Wireless communications systems and methods related to mechanisms to provide physical sidelink feedback channel (PSFCH) negotiation during sidelink connection establishment. A first UE may determine one or more conditions for PSFCH communications via the sidelink session(s) with the second UE. If the second UE accepts the conditions provided, the first and second UEs complete the sidelink connection. Further, while the first UE has a sidelink communication session with the second UE, a third UE may initiate another sidelink connection with the first UE. The first UE may compare the priority of the proposed sidelink connection with the priority of the ongoing sidelink communication session with the second UE. If the second UE's priority is greater, the first UE will maintain the second UE's status. If less, the first UE may engage in a renegotiation with second UE for the ongoing sidelink communication session to update their PSFCH conditions.

26 Claims, 10 Drawing Sheets

(51) Int. Cl.
*H04W 72/04* (2009.01)
*H04W 76/14* (2018.01)
*H04W 92/18* (2009.01)

(52) U.S. Cl.
CPC ....... *H04W 72/0493* (2013.01); *H04W 72/10* (2013.01); *H04W 76/14* (2018.02); *H04W 92/18* (2013.01)

(56) References Cited

U.S. PATENT DOCUMENTS

2020/0344722 A1* 10/2020 He ..................... H04L 1/1861
2021/0044956 A1* 2/2021 Kim ..................... H04L 1/1896
2021/0321267 A1* 10/2021 Kim ..................... H04B 7/0408

* cited by examiner

PHYSICAL SIDELINK FEEDBACK CHANNEL (PSFCH) NEGOTIATION

CROSS REFERENCE TO RELATED APPLICATIONS

The present application claims priority to and the benefit of the U.S. Provisional Patent Application No. 62/911,033, filed Oct. 4, 2019, which is hereby incorporated by reference in its entirety as if fully set forth below in its entirety and for all applicable purposes.

TECHNICAL FIELD

This application relates to wireless communication systems, and more particularly to physical sidelink feedback channel (PSFCH) negotiation among sidelink user equipment devices (UEs).

INTRODUCTION

To meet the growing demands for expanded mobile broadband connectivity, wireless communication technologies are advancing from the long term evolution (LTE) technology to a next generation new radio (NR) technology, which may be referred to as $5^{th}$ Generation (5G). In a wireless communication network implementing such wireless communication technologies, communication devices (which may otherwise be known as user equipment (UE)) may communicate with each other via a sidelink. With sidelinks, UEs do not need to tunnel through a base station (BS) or an associated core network.

Sidelink technology has been extended to provision for device-to-device (D2D) communications, vehicle-to-everything (V2X) communications, and/or cellular vehicle-to-everything (C-V2X) communications over licensed bands and/or unlicensed bands. In such communication, a receiving UE may concurrently receive groupcast as well as unicast messages from other UEs (whether both from the same transmitter or from different transmitters). Accordingly, the receiving UE may need to provide feedback (e.g., physical sidelink feedback channel signals) for individual sessions to the same transmitter or to different transmitters.

However, problems arise when the receiving UE is limited in how many PSFCH signals it may transmit concurrently. In these situations, the receiving UE may be unable to transmit PSFCH signals to all of the sessions (whether groupcast, unicast, etc.) with other UEs' transmitters. The other UEs may therefore not obtain (or known when to expect) feedback from the receiving UE for each sidelink session. A related problem arises when a newly-joined UE may cause the receiving UE to modify its feedback transmission rule, with trickle-down effects to the PSFCH signals to already-joined UEs. Thus, there is a need to provide UEs with the ability to negotiate PSFCH signaling capabilities between each other for sidelink connections.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes participating, by a first user equipment (UE), in establishing a sidelink with a second UE. The method further includes transmitting, by the first UE based on a number of existing sidelinks at the first UE, a condition on physical sidelink feedback channel (PSFCH) signals available for the second UE. The method further includes completing, by the first UE from the second UE, the sidelink in response to receiving an acceptance of the condition.

In an additional aspect of the disclosure, a method of wireless communication includes participating, by a first user equipment (UE), in establishing a sidelink with a second UE. The method further includes receiving, by the first UE, a condition on physical sidelink feedback channel (PSFCH) signals available at the second UE for the first UE, the condition being based on a number of existing sidelinks at the second UE. The method further includes sending, by the first UE, an acceptance of the condition to the second UE to complete the sidelink.

In an additional aspect of the disclosure, a user equipment (UE) includes a transceiver configured to participate in establishing a sidelink with a second UE. The UE further includes a processor configured to determine a condition on physical sidelink feedback channel (PSFCH) signals available for the second UE based on a number of existing sidelinks at the UE. The transceiver is further configured to transmit the condition to the second UE, and complete the sidelink in response to receipt of an acceptance of the condition from the second UE.

In an additional aspect of the disclosure, a user equipment (UE) includes a transceiver configured to participate in establishing a sidelink with a second UE. The transceiver is further configured to receive a condition on physical sidelink feedback channel (PSFCH) signals available at the second UE for the UE, the condition being based on a number of existing sidelinks at the second UE. The transceiver is further configured to send an acceptance of the condition to the second UE to complete the sidelink.

In an additional aspect of the disclosure, a non-transitory computer-readable medium having program code recorded thereon, the program code comprising code for causing a first user equipment (UE) to participate in establishing a sidelink with a second UE. The code further comprises code for causing the first UE to transmit, based on a number of existing sidelinks at the first UE, a condition on physical sidelink feedback channel (PSFCH) signals available for the second UE. The code further comprises code for causing the first UE to complete, from the second UE, the sidelink in response to receiving an acceptance of the condition.

In an additional aspect of the disclosure, a non-transitory computer-readable medium having program code recorded thereon, the program code comprising code for causing a first user equipment (UE) to participate in establishing a sidelink with a second UE. The code further comprises code for causing the first UE to receive a condition on physical sidelink feedback channel (PSFCH) signals available at the second UE for the first UE, the condition being based on a number of existing sidelinks at the second UE. The code further comprises code for causing the first UE to send an acceptance of the condition to the second UE to complete the sidelink.

In an additional aspect of the disclosure, a user equipment (UE) includes means for participating in establishing a sidelink with a second UE. The UE further comprises means for transmitting, based on a number of existing sidelinks at the UE, a condition on physical sidelink feedback channel (PSFCH) signals available for the second UE. The UE further comprises means for completing, from the second UE, the sidelink in response to receiving an acceptance of the condition.

In an additional aspect of the disclosure, a user equipment (UE) includes means for participating in establishing a sidelink with a second UE. The UE further includes means for receiving a condition on physical sidelink feedback channel (PSFCH) signals available at the second UE for the UE, the condition being based on a number of existing sidelinks at the second UE. The UE further includes means for sending an acceptance of the condition to the second UE to complete the sidelink.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
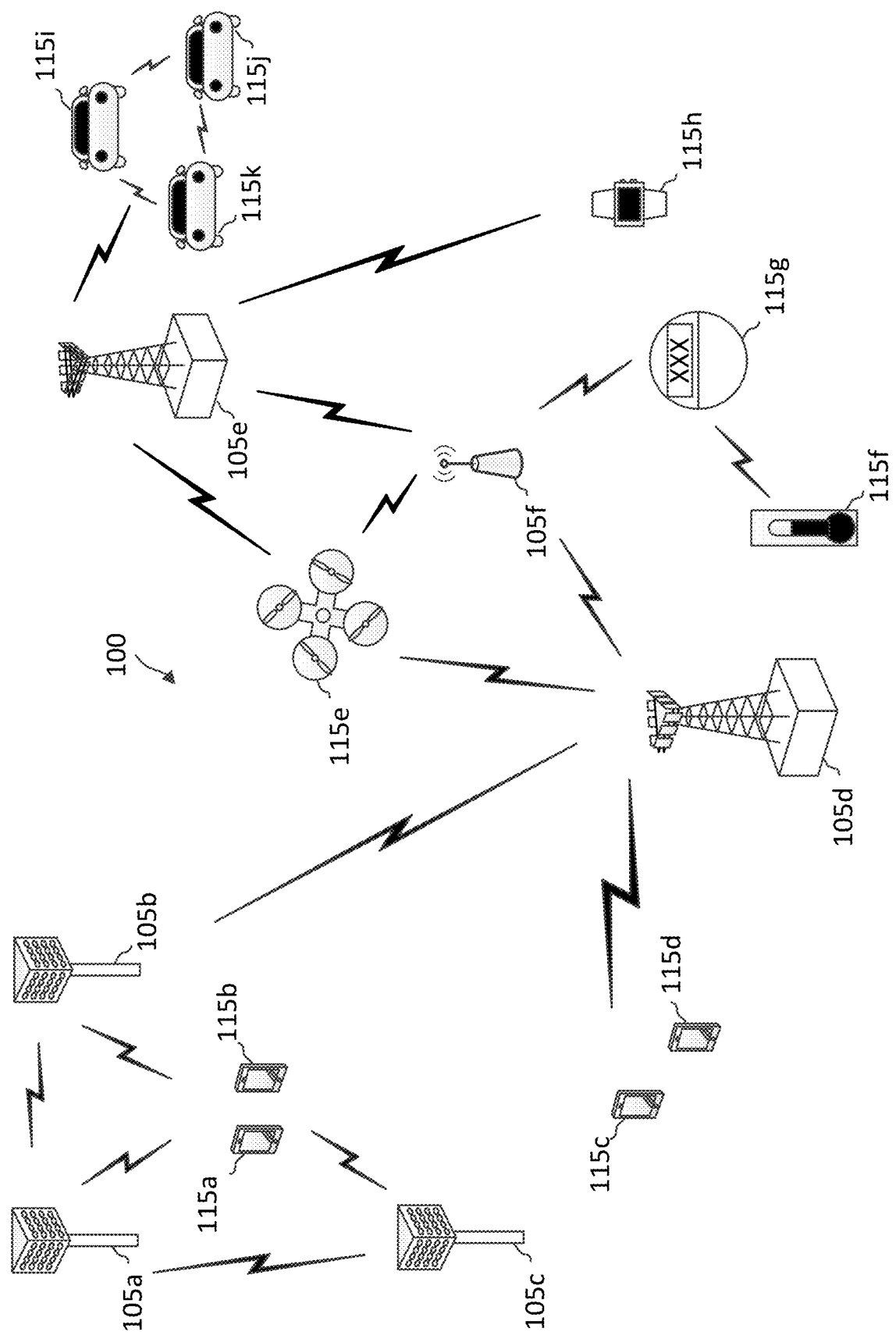
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR technologies had been extended to operate over an unlicensed spectrum. The deployment of NR technologies over an unlicensed spectrum is referred to as NR-U. NR-U is targeted for operations over the 5 gigahertz (GHz) and 6 GHz bands, where there are well-defined channel access rules for sharing among operators of the same radio access technology (RAT) and/or of different RATs. When a BS operates over an unlicensed spectrum, the BS does not have ownership of the spectrum or control over the spectrum. Thus, the BS is required to contend for channel access in the spectrum, for example, via clear channel assessment (CCA) and/or listen-before-talk (LBT) procedures.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum is relatively straight-forward as channel access in the dedicated spectrum or licensed spectrum is guaranteed. NR-U can bring benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) are required to contend for channel access in the spectrum, for example, via CCA and/or LBT procedures.

The present application describes mechanisms for physical sidelink feedback channel (PSFCH) negotiation among sidelink UEs. For example, as part of the PSFCH negotiation, a first UE may determine one or more parameters, also referred to herein as conditions, that may be imposed on PSFCH communications via the sidelink session(s) with the second UE. These may depend upon the priority of the sidelink connection, and include parameters such as a maximum number of PSFCH signals (transmissions) that the first UE may be able to provide to the second UE, a priority rule that the first UE may adopt if the number of sessions expecting PSFCH signaling is greater than the maximum number of PSFCH signals available, how many other sidelink sessions currently exist at the first UE, a priority of the other sidelink session(s), and/or power allocations between PSFCH signal transmissions. The second UE may accept or decline the conditions imposed by the first UE. If accepted, then the first and second UEs complete the sidelink connection. With this information, the second UE may know to not expect a PSFCH signal at a given time in view of the PSFCH conditions conveyed via negotiation.

As another example, while the first UE has a sidelink communication session ongoing with the second UE, a third UE may attempt to initiate another sidelink connection with the first UE. In such situations, the first UE may compare the priority of the proposed sidelink connection with third UE (e.g., with priority and/or QoS information included in the connection request or other message from the third UE) with the priority of the sidelink communication session already established with the second UE. If the priority of the ongoing sidelink communication session is greater than that of the requested sidelink connection with third UE, the first UE will prepare conditions for the requested sidelink connection with third UE that takes into account the sidelink session already ongoing with the second UE. This may mean, for example, that the third UE will have fewer PSFCH signaling opportunities available to it in view of those already associated with the sidelink communication session with the second UE.

If, instead, the priority of the ongoing sidelink communication session is less than the priority of the requested sidelink connection, the first UE may prioritize the PSFCH signaling opportunities for the requested sidelink connection (e.g., reduce the number of PSFCH signaling opportunities available for the second UE) and engage in a renegotiation with second UE for the ongoing sidelink communication session. The first and second UEs may, in response to the initiation of renegotiation, update their PSFCH conditions between each other.

Aspects of the present disclosure can provide several benefits. For example, by including PSFCH negotiation when establishing a sidelink connection, embodiments of the present disclosure facilitate a UE expecting PSFCH (e.g., HARQ ACK/NACK) to know which types of messages (e.g., unicast or groupcast) should actually receive a PSFCH message, and which types of messages will not. Further, embodiments of the present disclosure facilitate renegotiating PSFCH parameters in response to new sidelink connections with potentially greater priority being requested.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. A TXOP may also be referred to as channel occupancy time (COT).

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. A UE 115 may transmit, during sidelink communications, physical sidelink shared channel (PSSCH) data, physical sidelink shared control channel (PSCCH) sidelink control information (SCI), sidelink COT sharing SCI, sidelink scheduling SCI, and/or physical sidelink feedback channel (PSFCH) ACK/NACK feedbacks (e.g., HARQ for sidelink) to another UE and/or receive PSSCH data, PSCCH SCI, sidelink COT sharing SCI, sidelink scheduling SCI, and/or PSFCH ACK/NACK feedbacks from another UE 115.

As already noted, a UE 115 receiving sidelink communication from another UE 115 (e.g., PSSCH data) may be limited in transmitting PSFCH signals back to the transmitting UE 115, depending on how many other sessions the receiving UE 115 has going at the same time with to the same transmitting UE 115 or other transmitting UEs 115 with which the UE 115 is engaged in unicast/groupcast sidelink sessions. To address such issues, according to embodiments of the present disclosure a UE 115 (e.g., a UE1 for purposes of discussion) engages in PSFCH negotiation with the other UE 115 (e.g., a UE2) as a sidelink connection is being set up.

For example, as part of the PSFCH negotiation, the UE1 may determine one or more parameters, also referred to herein as conditions, that may be imposed on PSFCH communications via the sidelink session(s) with the UE2. These may depend upon the priority of the sidelink connection, and include parameters such as a maximum number of PSFCH signals (transmissions) that the UE1 may be able to provide to the UE2 with which the connection is being established, a priority rule that the UE1 may adopt if the number of sessions at the UE1 expecting PSFCH signaling is greater than the maximum number of PSFCH signals available, how many other sidelink sessions currently exist at the UE1, a priority of the other sidelink session(s), and/or power allocations between PSFCH signal transmissions. The UE2 may accept or decline the conditions imposed by the UE1 that transmitted the conditions. If accepted, then the UEs 1 and 2 complete the sidelink connection. With this information, the UE2 may know to not expect a PSFCH signal at a given time in view (in response to transmitting data, such as PSSCH data) of the conditions conveyed via negotiation at the time of connection establishment (e.g., in situations where the number of sessions including those with the UE2 (and/or other UEs) exceeds the number of sessions that the UE1 may be able to handle at a given point in time).

As another example, while the UE1 has a sidelink communication session ongoing with the UE2, another UE 115 (e.g., identified as UE3 here for simplicity of discussion) may attempt to initiate another sidelink connection with the UE1. In such situations, the UE1 may compare the priority of the proposed sidelink connection with UE3 (e.g., with priority and/or QoS information included in the connection request or other message from the UE3) with the priority of the sidelink communication session already established with UE2. If the priority of the ongoing sidelink communication session is greater than that of the requested sidelink connection with UE3, the UE1 will prepare conditions for the requested sidelink connection with UE3 that takes into account the sidelink session already ongoing with UE2. This may mean, for example, that the UE3 will have even fewer PSFCH signaling opportunities available to it in view of those already associated with the sidelink communication session with UE2.

If, instead, the priority of the ongoing sidelink communication session is less than the priority of the requested sidelink connection, the UE1 may prioritize the PSFCH signaling opportunities for the requested sidelink connection (e.g., reduce the number of PSFCH signaling opportunities available for the UE2) and engage in a renegotiation with UE2 for the ongoing sidelink communication session. The UE1 and UE2 may, in response to the initiation of renegotiation, update their PSFCH conditions between each other. While discussed with respect to individual UEs, aspects of the present disclosure may apply to any number of UEs 115 forming or seeking to form sidelink connections between individual or groups of UEs.

Figure 2:
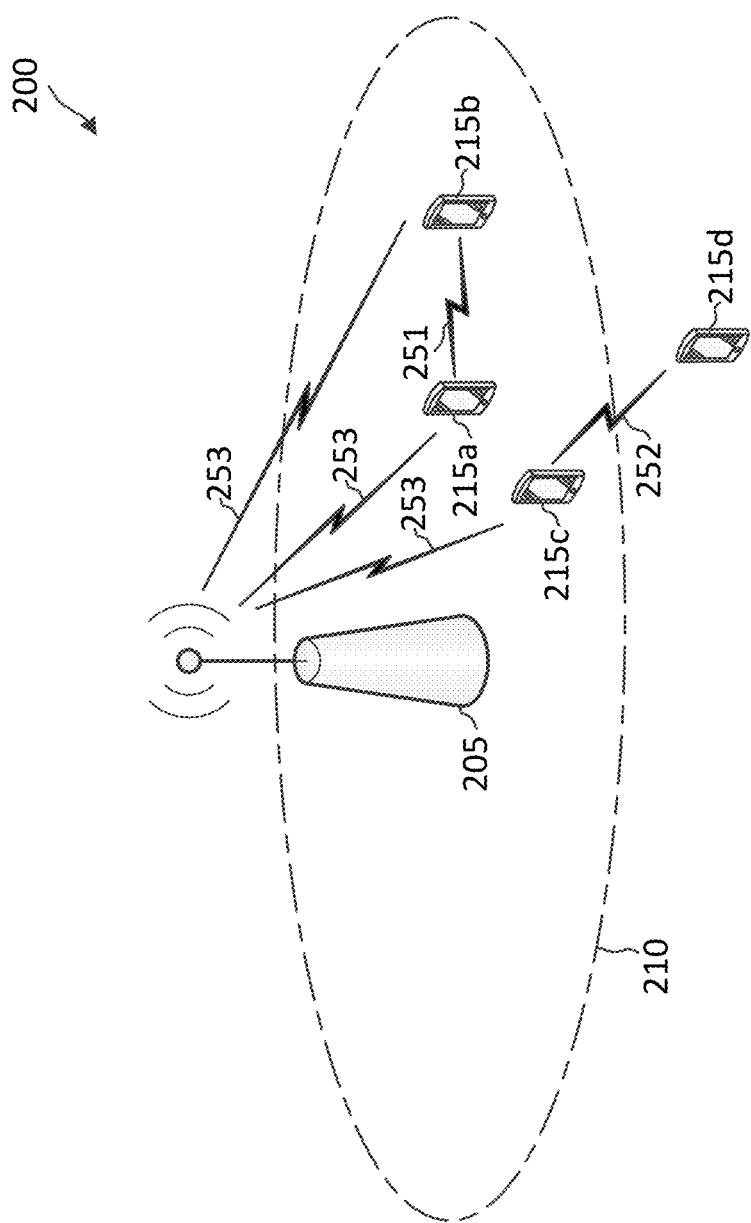
FIG. 2 illustrates a wireless communication network that provisions for sidelink communications according to some embodiments of the present disclosure.

FIG. 2 illustrates an example of a wireless communication network 200 that provisions for sidelink communications according to embodiments of the present disclosure. The network 200 may be similar to the network 100. FIG. 2 illustrates one BS 205 and four UEs 215 for purposes of simplicity of discussion, though it will be recognized that embodiments of the present disclosure may scale to any suitable number of UEs 215 and/or BSs 205 (e.g., 2, 3, 6, 7, 8, or more). The BS 205 and the UEs 215 may be similar to the BSs 105 and the UEs 115, respectively. The BS 205 and the UEs 215 may communicate over the same spectrum.

In the network 200, some of the UEs 215 may communicate with each other in peer-to-peer communications. For example, the UE 215a may communicate with the UE 215b over a sidelink 251, and the UE 215c may communicate with the UE 215d over another sidelink 252. In some instances, the sidelinks 251 and 252 are unicast bidirectional links, each between a pair of UEs 215. In some other instances, the sidelinks 251 and 252 can be multicast links supporting multicast sidelink services among the UEs 215. Multicast sidelink services may include groupcast or broadcast links. In a groupcast link, a transmitting UE 215 has a link with a sub-set of specific UEs 215 in its vicinity. In a broadcast link, a transmitting UE 215 has a link with all UEs 215 within its range. As an example of multicast sidelink services, the UE 215c may transmit multicast data to the UE 215d and the UE 215b over sidelinks.

Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d is outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

In some aspects, the network 200 may be a LTE network. The transmissions by the UE 215a and the UE 215b over the sidelink 251 and/or the transmissions by the UE 215c and the UE 215d over the sidelink 252 may reuse a LTE PUSCH waveform, which is a discrete Fourier transform-spreading (DFT-s) based waveform. In some aspects, the network 200 may be an NR network. The transmissions by the UEs 215 over the sidelinks 251 and/or 252 may use a cyclic-prefix-OFDM (CP-OFDM) waveform. In some aspects, the network 200 may operate over a shared radio frequency band (e.g., an unlicensed band). The transmissions by the UEs 215 over the sidelinks 251 and/or 252 may use a frequency interlaced waveform.

Figure 3:
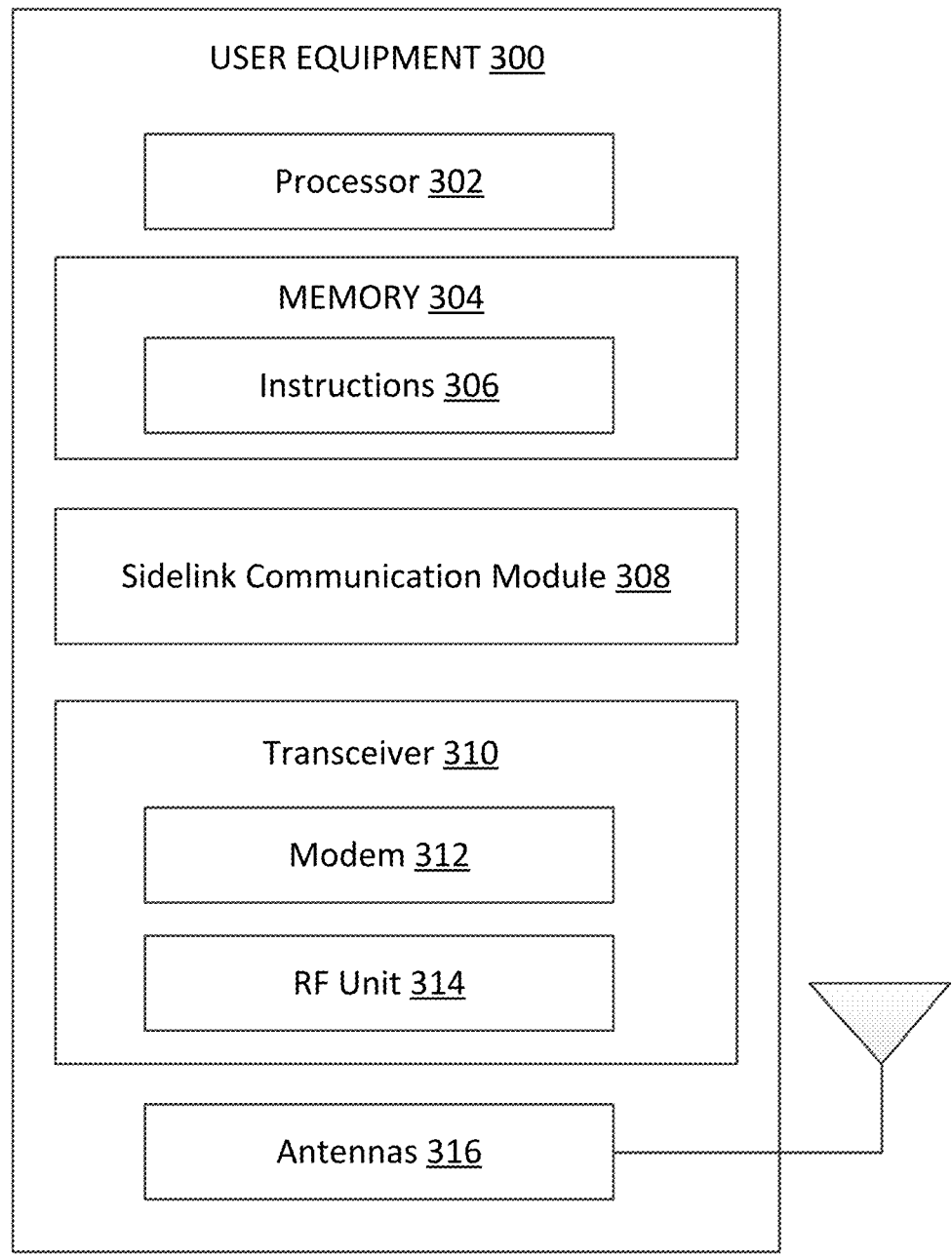
FIG. 3 is a block diagram of a user equipment (UE) according to some embodiments of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, an sidelink communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 5-10. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 308 may be implemented via hardware, software, or combinations thereof. For example, the sidelink communication module 308 may be implemented as a processor, circuit, and/or instructions 306 stored in the memory 304 and executed by the processor 302. In some instances, the sidelink communication module 308 can be integrated within the modem subsystem 312. For example, the sidelink communication module 308 can be implemented by a combination of software components (e.g., executed by a DSP or a general processor) and hardware components (e.g., logic gates and circuitry) within the modem subsystem 312.

The sidelink communication module 308 may be used for various aspects of the present disclosure, for example, aspects of FIGS. 5-10. The sidelink communication module 308 is configured to participate in PSFCH negotiation. In some examples, this may be as the initiator of negotiation with another UE 115. In other examples, this may be as the other party in the negotiation with an initiating UE 115.

For example, the sidelink communication module 308 may be configured to initiate a sidelink communication setup with another UE 115 (referred to herein again as a UE2, a second UE to the first UE which in this example is UE 300). This may include, as a preliminary matter, transmitting a sidelink resource configuration request, a sidelink resource request, and/or a sidelink COT sharing request to a BS (e.g., the BSs 105 and 215) and/or receiving a sidelink resource configuration from the BS 105. The sidelink resource configuration may indicate a time, a periodicity, and/or a frequency band where the UE 300 may contend for COTs for sidelink communication (e.g., PSSCH, PSCCH, and/or PSFCH). In some aspects, the sidelink communication module 308 is configured to apply HARQ techniques to sidelink data communication, as well as transmit a scheduling SCI including an indication of an LBT type and/or a resource to be used by a receiving sidelink UE (i.e., UE2 in this example) to transmit a HARQ ACK/NACK for the sidelink data communication. The sidelink communication module 308 may be configured to receive a sidelink data communication associated with a HARQ process from the other UE2, as well as receive a scheduling SCI including an indication of an LBT type and/or a resource to be used by the UE 300 to transmit a HARQ ACK/NACK for the sidelink data communication back to the other UE2.

The sidelink communication setup may further include sending a connection setup request to the other UE2, for example an RRC connection setup. As the UE 300 and the UE2 engage in a configuration process (e.g., RRC configuration), the sidelink communication module 308 may be configured to engage in negotiating PSFCH with the UE2 according to embodiments of the present disclosure. For example, during the connection setup the sidelink communication module 308 may configure information regarding constraints on how many PSFCH signals the UE 300 may be able to transmit to connections including the connection being configured with UE2.

The information that the sidelink communication module 308 may determine, compile, receive, etc., includes a maximum number of simultaneous PSFCH signals that the UE 300 may be able to transmit to the UE2. This may be based on the capabilities of the UE 300 (e.g., based on the hardware and/or software capabilities of the UE 300, whether PSFCH signals to be sent are on contiguous frequency resources, etc.). This maximum number, also referred to herein by the variable N, may take into account any other sidelink connections already existing between the UE 300 and any other UEs (including, in some examples, other sidelink connections with the UE2). This is because the UE 300 may be able to receive concurrently groupcast and/or unicast messages from the same transmitter (e.g., of UE2) for which the UE 300 may need to provide feedback (e.g., PSFCH), and/or receive groupcast and/or unicast messages from different transmitters of different UEs for which the UE 300 may need to provide the same kind of feedback.

The sidelink communication module 308, as part of configuring information, may further access and/or determine one or more priority rules that the UE 300 may apply if the number of sidelink connections expecting feedback (e.g., with UE2 and/or other UEs) exceeds the maximum number N of simultaneous PSFCH signals that the UE 300 may be able to transmit at a given time. For example, this rule information may be stored in the memory 304, and may have been pre-provisioned on the UE 300, dynamically determined/provisioned, and/or dynamically updated by a user of the UE 300, a BS 105, and/or another UE 115. The sidelink communication module 308 may access this rule information and/or otherwise determine the rule information from a combination of stored information and current status of the UE 300.

In some examples, the priority rule includes prioritizing some types of connections over other types of connections. For example, the priority rule may specify prioritizing unicast packets over groupcast packets, such that a UE expecting feedback from the UE 300 may expect a PSFCH signal in response to a unicast packet, but not a groupcast packet (where the number of PSFCH signals expected exceeds the maximum number N). As another example, the priority rule may specify prioritizing packets based on the Layer 1 priority of packets received in unicast and/or groupcast messages from other UEs, including UE2.

As yet another example, the priority rule may specify prioritizing packets based on a ratio of messages. For example, the ratio may be of groupcast to unicast messages, e.g. one groupcast message to multiple unicast messages. The ratio may be on a per-slot basis—for example, one groupcast message in fixed slot intervals (such as every fourth slot, etc. to continue with this example), with every other slot sending PSFCH signal(s) to unicast messages. In some examples, if the UE 300 has received messages from two different UEs that had equal priority messages, and there is only one PSFCH signal available per the UE 300's existing capability, then the ratio parameter may be used to determine when and to which UEs to send the PSFCH signal. The slot at which a UE can expect a PSFCH signal (e.g., in situations where the UE 300 may need to send more feedback (i.e., PSFCH signals) than its ability) may be dependent on the transmit ID of the UE 300. For example, if two UEs (identified in this particular example as UE10, UE11) are expecting feedback from UE 300 for their packets, UE 300 may send (e.g., under direction of the sidelink communication module 308) the feedback for UE10 based on the source ID of UE10 (e.g., every $10^{th}$ slot), and feedback for UE11 based on the source ID of UE11 (e.g., every $11^{th}$ slot), as just a few examples.

As another example of configuring information, the sidelink communication module 308 may determine a power allocation that the UE 300 would provide for each of its PSFCH transmissions to UE2 (and/or other UEs expecting PSFCH from the UE 300 in response to a sidelink transmission of a groupcast and/or unicast message). For example, where N (for a maximum number of PSFCH signals that the UE 300 may be able to transmit to UE2 for simultaneous sidelink connections) equals 2, power allocation may include determining how to allocate the available power at the UE 300 for the transmissions to the two PSFCH signals to be sent to UE2. The power allocation may also be between the UE2 and any other sidelink connections the UE 300 has with other UEs 115 at the same time.

The sidelink communication module 308 may determine one, some, or all of the above exemplary information as part of PSFCH negotiation according to embodiments of the present disclosure. As further part of the negotiation, the sidelink communication module 308 may cause the transceiver 310 and antenna 316 to transmit the information to the UE2. In some embodiments, the sidelink communication module 308 may explicitly signal the UE2 what type of PSFCH feedback to expect (e.g., what slots to expect PSFCH, what types of sidelink messages for which to expect PSFCH, etc.). Alternatively, the sidelink communications module 308 may implicitly signal the UE2 by including some or all of the determined information (such as the examples given above) in the PSFCH negotiation transmission to the UE2. The UE2 may then infer from the information provided when to expect PSFCH signaling from the UE 300 for sidelink connection(s) between the UE 300 and the UE2.

The sidelink communication module 308 may further assist the UE 300 in sidelink connection setup with a new UE 115 while one or more existing sidelink connections already exist between the UE 300 and another UE (or with multiple UEs). Continuing with the example with UE2, the sidelink communication module 308 may assist in situations where a UE3 (as an exemplary new UE 115) initiates a sidelink connection setup process with the UE 300, while the UE 300 has an existing connection with UE2. In such situations, the sidelink communication module 308 may compare the priority of the requested connection from UE3 with the priority of the existing connection with UE2 (e.g., priorities of the packets, QoS indicators of the packets, etc.). If the priority of the new connection request with UE3 exceeds the priority of the existing connection with UE2, the sidelink communication module 308 may prioritize PSFCH signaling with the UE3 over UE2. This reduces the number of PSFCH signaling opportunities available for the existing connection with UE2.

The sidelink communication module 308 engages in negotiation with the UE3 based on this determination (including exchanging information as discussed above). The sidelink communication module 308 may further initiate renegotiation for the sidelink connection with UE2 (where the UE3's priority for its requested sidelink connection is greater than that with the UE2), for example an RRC reconfiguration message. As part of this renegotiation, the sidelink communication module 308 may update the PSFCH configuration parameters (i.e., some combination of the information discussed above) with the UE2.

If the priority of the new connection request with UE3 does not exceed the priority of the existing connection with UE2, the sidelink communication module 308 may prioritize PSFCH signaling with the UE2 over the requested new connection with UE3. In this scenario, the sidelink communication module 308 configures information for the UE3 in a like manner as discussed above for the example with UE2. This configured information may take into account the number of available PSFCH signals already allocated for use with UE2, thereby further reducing the maximum number of PSFCH signals available for use with UE3 for the newly requested sidelink connection. Thus, the UE3 may have fewer PSFCH signaling opportunities available to it in view of those already associated with the sidelink communication session with UE2.

The sidelink communication module 308 may be configured to engage in PSFCH negotiation with another UE 115 that sends negotiation information to the UE 300. This may correspond, for example, to a situation where the UE 300 is the one that will be expected PSFCH feedback (i.e., HARQ feedback) from the UE 115 for a transmission the UE 300 makes to the UE 115. The negotiation information from UE 115 may be one or more types like those discussed above already, such as a maximum number of PSFCH signals available to be sent to the UE 300, one or more priority rules that the UE 115 may apply where that maximum number is exceeded, a power allocation for PSFCH signals corresponding to different sidelink connections, etc. The negotiation information from UE 115 may be transmitted in a variety of ways, including as noted above explicit signaling or implicit signaling. For example, a bit pattern may be used to represent an index into a look-up table in the memory 304 of UE 300. That look-up table may store different PSFCH configuration alternatives, power allocations, priorities, priority rules, etc. Alternatively, the information may be transmitted (instead of a reduced representation thereof) such that action is taken by the UE 300 based on the information transmitted instead of information accessed from a look-up table.

When the UE 300 transmits data to the UE 115, the sidelink communication module 308 may use the information received from the UE 115 in PSFCH negotiation to determine whether PSFCH signaling (e.g., a HARQ ACK/NACK in response to data sent from the UE 300 to the UE 115) is expected for a particular transmission. For example, if the UE 300 transmits a groupcast message but the UE 115 had indicated in PSFCH negotiation that unicast messages would be prioritized over groupcast messages, and the UE 115 had more sidelink connections than its maximum number possible for PSFCH, the sidelink communication module 308 may determine that the UE 300 should not expect a PSFCH signal in response. As a result, the UE 300 may not attempt to re-transmit the data when a HARQ ACK/NACK is not received.

As another example, where the UE 115 provided power allocation information, the sidelink communication module 308 may use this to determine whether to retransmit the data or not based on PSFCH expectations. The sidelink communication module 308 may compare the power allocations to one or more thresholds. For example, if the power allocation exceeds a threshold, the sidelink communication module 308 may cause the UE 300 to retransmit the data if a PSFCH signal is not received (i.e., assume a HARQ NACK), and if the power allocation is below a threshold (either the same threshold or a different threshold for purposes of hysteresis), the sidelink communication module 308 may not cause the UE 300 to retransmit the data if no PSFCH signal is received (i.e., assume a HARQ ACK).

Continuing with the example of UE 300 transmitting data to the UE 115, in situations where the UE 115 initiates PSFCH renegotiation with the UE 300, the sidelink communication module 308 may engage in the renegotiation according to the principles and aspects discussed above.

As shown, the transceiver 310 may include the modem subsystem 312 and the RF unit 314. The transceiver 310 can be configured to communicate bi-directionally with other devices, such as the BSs 105 and other UEs 115 (e.g., via sidelinks). The modem subsystem 312 may be configured to modulate and/or encode the data from the memory 304 and/or the sidelink communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., PSSCH data and/or PSCCH control information, PSFCH negotiation information, HARQ ACK/NACK) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices (e.g., groupcast and/or unicast messages concurrently). The antennas 316 may provide the received data messages for processing and/or demodulation at the transceiver 310. The transceiver 310 may provide the demodulated and decoded data (e.g., PSSCH data and/or PSCCH control information, PSFCH negotiation information, HARQ ACK/NACK) to the sidelink communication module 308 for processing. The antennas 316 may include multiple antennas of similar or different designs in order to sustain multiple transmission links. The RF unit 314 may configure the antennas 316.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
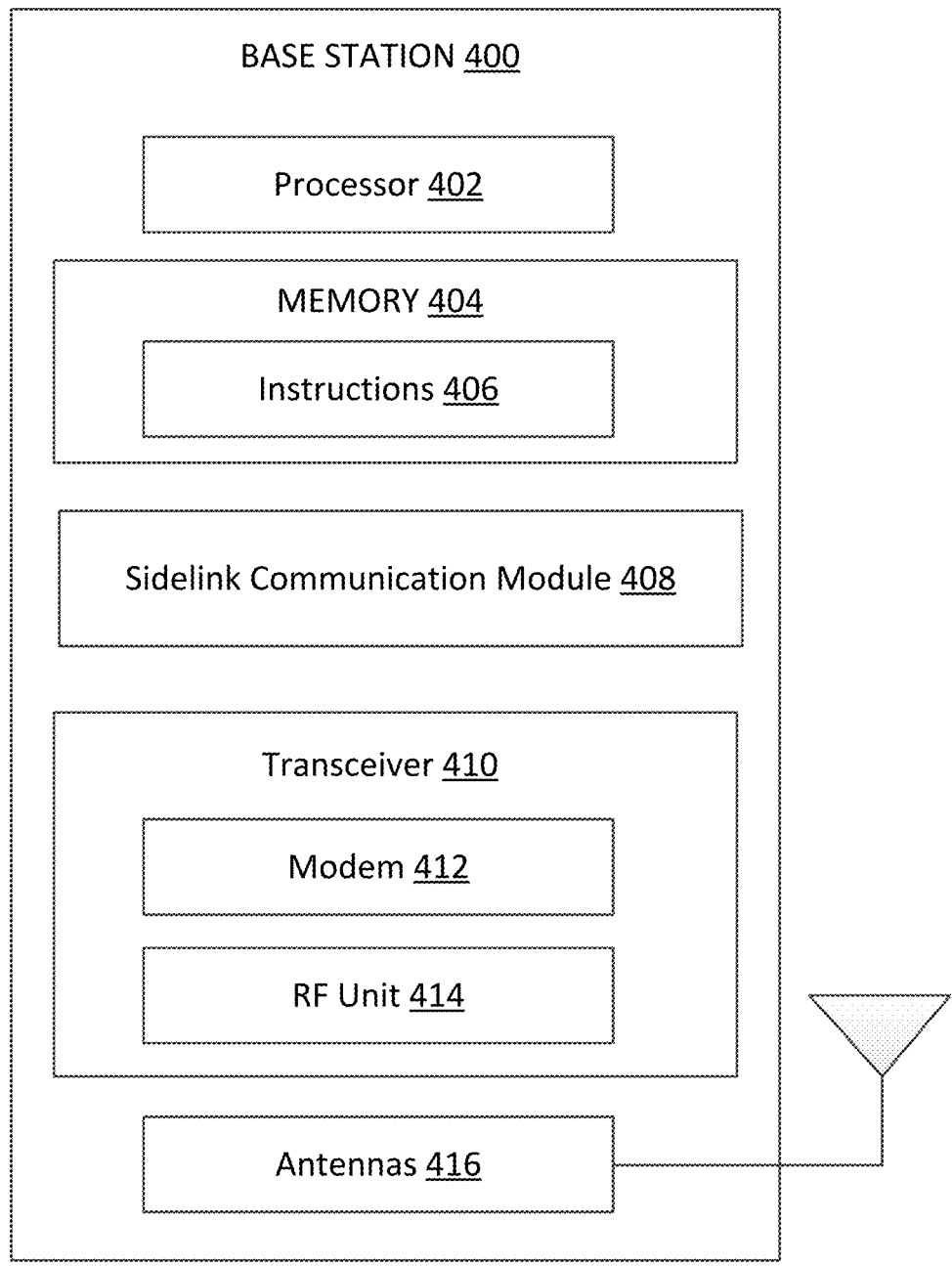
FIG. 4 is a block diagram of an exemplary base station (BS) according to some embodiments of the present disclosure.

FIG. 4 is a block diagram of an exemplary BS 400 according to some aspects of the present disclosure. The BS 400 may be a BS 105 in the network 100 as discussed above in FIG. 1. A shown, the BS 400 may include a processor 402, a memory 404, an sidelink communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

The sidelink communication module 408 may be implemented via hardware, software, or combinations thereof. For example, the sidelink communication module 408 may be implemented as a processor, circuit, and/or instructions 406 stored in the memory 404 and executed by the processor 402. In some instances, the sidelink communication module 408 can be integrated within the modem subsystem 412. For example, the sidelink communication module 408 can be implemented by a combination of software components (e.g., executed by a DSP or a general processor) and hardware components (e.g., logic gates and circuitry) within the modem subsystem 412. The sidelink communication module 408 may be configured to configured to configure a pool of sidelink resources for sidelink UEs (e.g., the UEs 115, 215, and/or 300) for sidelink communications (e.g., PSSCH, PSCCH) and/or a pool of sidelink ACK/NACK resources for PSFCH communications, and/or transmit a sidelink resource configuration to the sidelink UEs. The sidelink resource configuration may indicate a time, a periodicity, and/or a frequency band where the sidelink UEs may contend for COTs for sidelink communication (e.g., PSSCH/PSCCH/PSFCH). In some aspects, the sidelink communication module 408 is configured to receive a sidelink resource request from the sidelink UE and the sidelink resource configuration may be transmitted in response to the request.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., sidelink resource configuration) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 400 to enable the BS 400 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., a sidelink resource configuration request) to the sidelink communication module 408 for processing. The antennas 416 may include multiple antennas of similar or different designs in order to sustain multiple transmission links.

In an example, the transceiver 410 is configured to transmit a resource configuration to a UE (e.g., the UEs 115 and 300) and receive a UL control channel signal (e.g., a PUCCH signal) modulated by HARQ ACK/NACK and SR from the UE 300, for example, by coordinating with the sidelink communication module 408.

In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
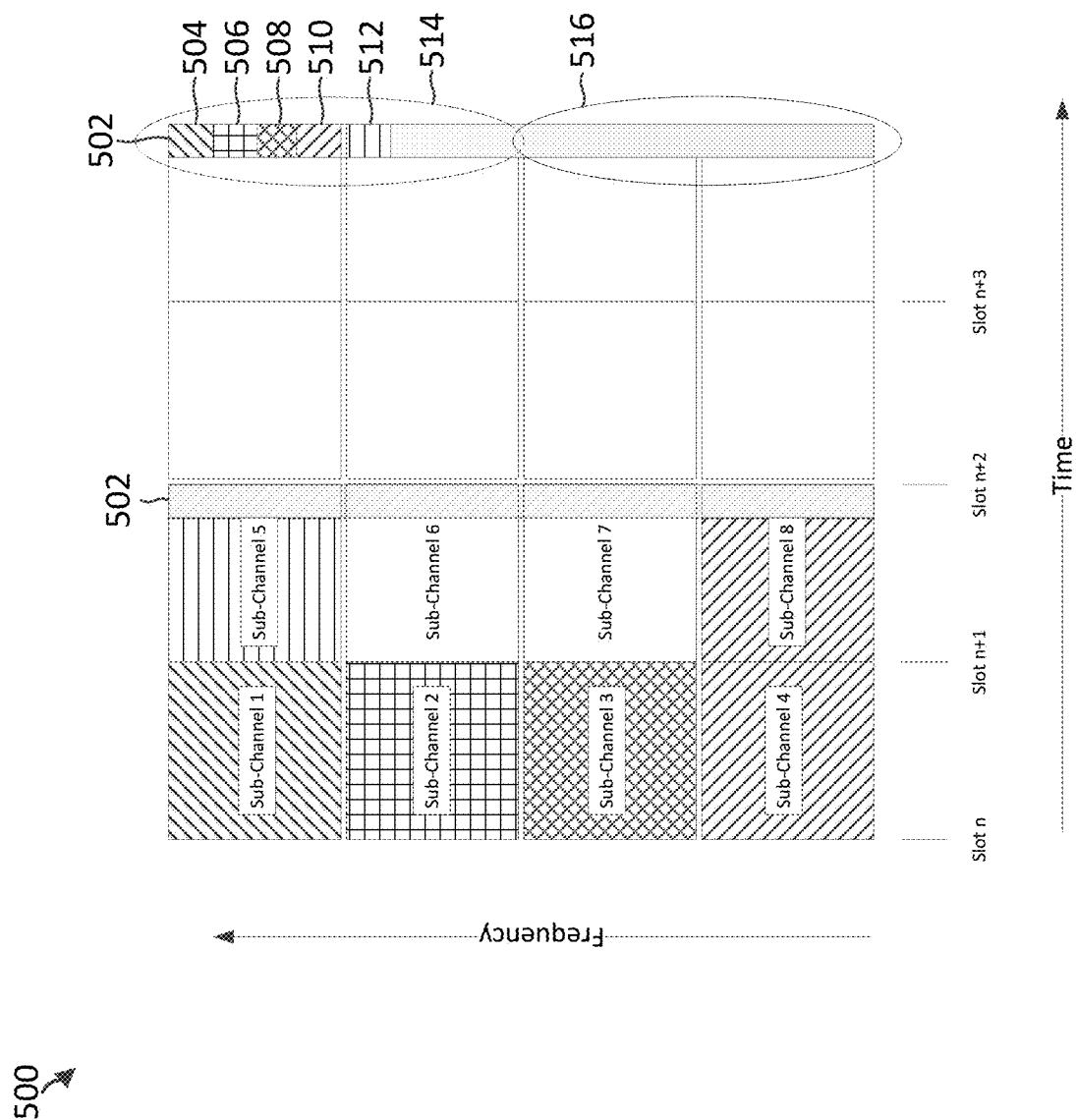
FIG. 5 illustrates a sidelink feedback format according to some embodiments of the present disclosure.

FIG. 5 illustrates a sidelink feedback format 500 according to some embodiments of the present disclosure. The format 500 is illustrative of sidelink resources available for data transmission as well as PSFCH signal transmission for HARQ ACK/NACK. FIG. 5 illustrates a few exemplary slots across time identified as slot n, slot n+1, slot n+2, and slot n+3 to facilitate discussion of aspects of the present disclosure. The number of slots may extend prior to slot n and past slot n+3. FIG. 5 further illustrates multiple sub-channels across frequency, illustrated as sub-channel 1 through sub-channel 8. The number of sub-channels, as well as their placement in frequency and time, is illustrative in FIG. 5.

As further illustrated in FIG. 5, resources 502 are available in slots n+1 and n+3. These resources 502 may be reserved for HARQ signaling (e.g., PSFCH signaling). Their spacing across slots is exemplary in FIG. 5. In some embodiments, a subset of the resources 502 are allocated/reserved for odd numbered transmitting UEs (e.g., UEs 115, 215, 300), and another subset of resources 502 allocated/reserved for even numbered transmitting UEs (e.g., UEs 115, 215, 300). These subsets are illustrated as subset 514 and subset 516. For example, subset 514 may be reserved for the odd numbered transmitting UEs, and subset 516 for the even numbered (or vice versa).

In some aspects, HARQ techniques may be applied to sidelink communication (e.g., D2@, V2V, V2X and/or C-V2X) to improve communication reliability. In some instances, a sidelink UE may be configured with a pool of PSSCH/PSCCH resources and a pool of PSFCH resources (for ACK/NACK transmissions). There may be a mapping between the pool of PSSCH/PSCCH resources and the pool of PSFCH resources. Each PSSCH/PSCCH transmission may be mapped to a PSFCH resource. In other words, there is a corresponding PSFCH resource for each PSSCH/PSCCH transmission. In some instances, the PSSCH/PSCCH transmission and the PSFCH transmission may not be adjacent to each other. Thus, COT sharing between PSSCH/PSCCH transmission and the PSFCH transmission may be difficult. However, it may be advantageous to configure the PSFCH resource to be within a COT of the PSSCH/PSCCH transmission to save LBT overhead or delay.

This mapping between PSSCH/PSCCH resources and PSFCH resources is illustrated in FIG. 5. Each sub-channel for a given transmitting UE may have a corresponding set of resources from among the resources 502 for their PSFCH signaling. For example, as illustrated in FIG. 5, resources 504 are reserved for sub-channel 1, resources 506 are reserved for sub-channel 2, resources 508 are reserved for sub-channel 3, resources 510 are reserved for sub-channel 4 and sub-channel 8, and resources 512 are reserved for sub-channel 5. In the example of FIG. 5, each of the sub-channels may carry messages such as unicast messages, groupcast messages, or broadcast messages. For example, sub-channel 1 may carry a unicast message, and sub-channels 4 and 8 may together carry a groupcast message. This is exemplary only; these sub-channels may carry any of unicast, groupcast, and broadcast messages.

At each of the corresponding resources 504-512, the UEs 115 transmitting on the corresponding sub-channels may expect PSFCH signals with ACK/NACK responses. According to embodiments of the present disclosure, the receiving UEs may engage in PSFCH negotiation with transmitting UEs (e.g., at the time of sidelink connection configuration). Based on the results of that PSFCH negotiation, transmitting UEs may know when to expect PSFCH signaling in response to messages (e.g., unicast or groupcast messages) from the receiving UEs. For example, a transmitting UE may know to expect a PSFCH signal for only a unicast message sent to a receiving UE, and not for any (or some) of groupcast messages it sends to the receiving UE. This would be based, for example, on the information explicitly or implicitly signaled to the transmitting UE during PSFCH negotiation. As another example, a transmitting UE may know to expect a PSFCH signal for a given message at a determined interval (such as every other slot, or every $x^{th}$ slot, etc.). As another example, a transmitting UE may determine whether or not to expect a PSFCH signal based on a power allocation identified for the given sidelink connection.

Figure 6:
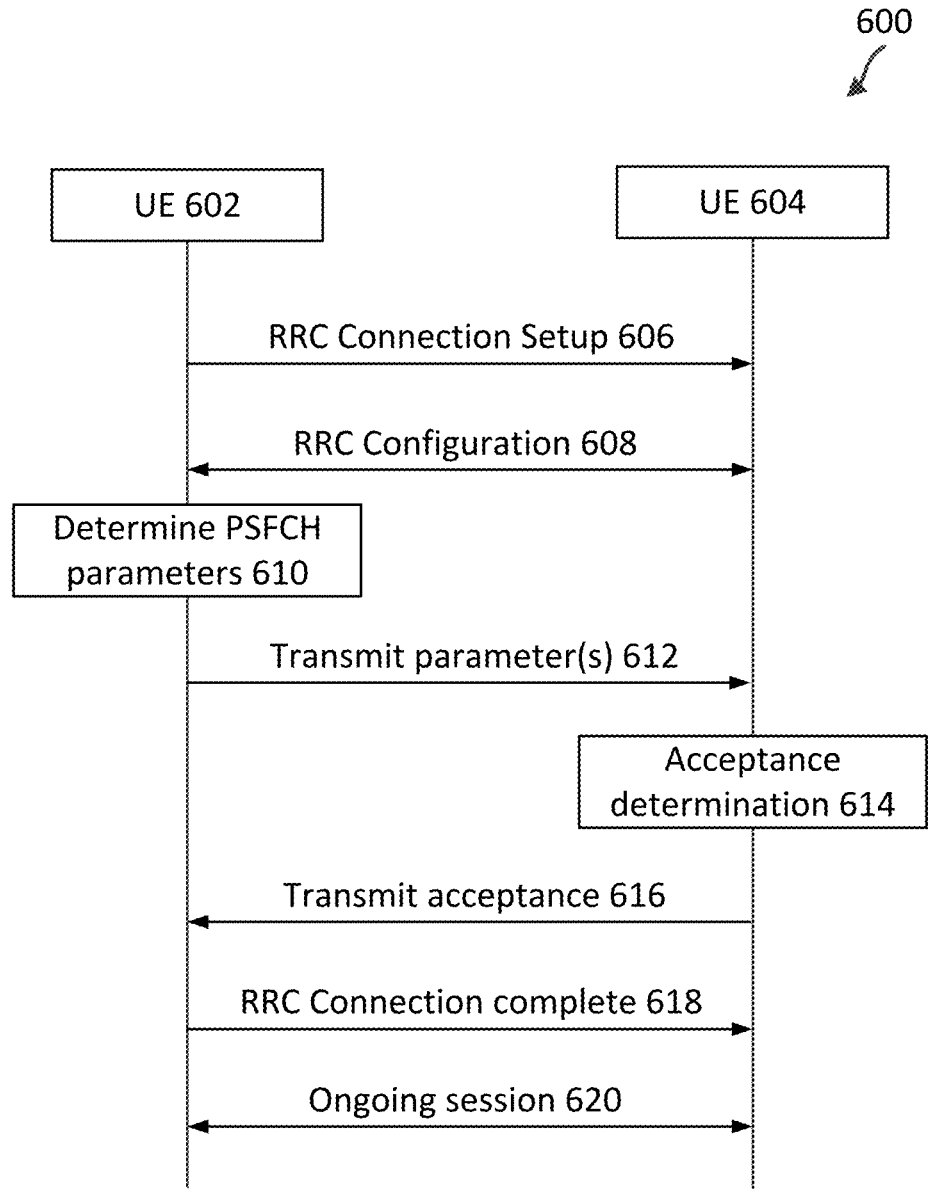
FIG. 6 illustrates a protocol diagram of a sidelink communication and negotiation scheme according to some embodiments of the present disclosure.

Turning now to FIG. 6, illustrated is a protocol diagram of a sidelink communication and negotiation scheme 600 according to some embodiments of the present disclosure. For example, FIG. 6's scheme 600 may illustrate an initial PSFCH negotiation for a new sidelink connection according to some embodiments. Communication may be between a UE 602 (of which UEs 115, 215, 300 are examples) and a UE 604 (of which UEs 115, 215, and 300 are also examples) to set up and use an exemplary sidelink connection. While illustrated from the perspective of UE 602 providing PSFCH negotiation information to UE 604, the UE 604 may likewise engage in PSFCH negotiation with the UE 602 and/or one or more other UEs with which the UE 604 has or will have sidelink connections.

At action 606, the UE 602 initiates a connection setup for a sidelink connection with UE 604 (e.g., an RRC connection setup). This may include, for example, the UE 602 transmitting an RRC connection request message to the UE 604.

At action 608, the UE 602 and the UE 604 engage in sidelink connection configuration, for example RRC configuration. This may include multiple signals transmitted between the UEs 602 and 604 as part of the configuration process.

At action 610, the UE 602 may determine one or more PSFCH parameters (also referred to as conditions on PSFCH) pertinent to the UE 602. While illustrated as occurring after action 608, action 610 may occur concurrent to, or just prior to, the configuration process illustrated at action 608. The UE 602 may determine parameters such as the maximum number of simultaneous PSFCH signals that the UE 602 may be able to transmit to the UE 604. The parameters may alternatively or additionally include one or more priority rules that the UE 602 may apply if the number of sidelink connections expecting PSFCH feedback exceeds the maximum number of simultaneous PSFCH signals the UE 602 is capable of. The parameters may alternatively or additionally include a power allocation that the UE 602 may apply to each of its simultaneous PSFCH signals (e.g., with multiple to the UE 604 and/or to different UEs, one of which being the UE 604).

At action 612, the UE 602 may transmit the one or more PSFCH parameters determined at action 610. This may be transmitted explicitly or implicitly, as discussed with respect to prior figures above.

At action 614, the UE 604 receives the transmitted one or more transmitted PSFCH parameters from the UE 602 and processes them. In some examples, this includes the UE 604 determining whether to accept or decline the conditions on PSFCH. As part of the acceptance determination, the UE 604 may store the parameters and/or load any rules/actions based on the parameters for use in an ongoing communication session with the UE 602.

At action 616, the UE 604 transmits the acceptance to the UE 602, the acceptance being of the conditions placed on PSFCH by the UE 602 as expressed in the PSFCH parameters transmitted at action 612.

At action 618, the UE 602 completes the sidelink connection request with the UE 604. This may include, for example, the UE 602 transmitting a connection complete message, such as an RRC connection complete message, to the UE 604.

At action 620, the UE 602 and the UE 604 participate in an ongoing communication session via the established sidelink connection. During the ongoing communication session, when the UE 604 sends data to the UE 602, the UE 604 will expect a PSFCH signal with ACK/NACK dependent upon the results of the PSFCH negotiation with the UE 602 (e.g., dependent upon the type of communication session such as unicast or groupcast, power allocation, timing, etc.).

Figure 7:
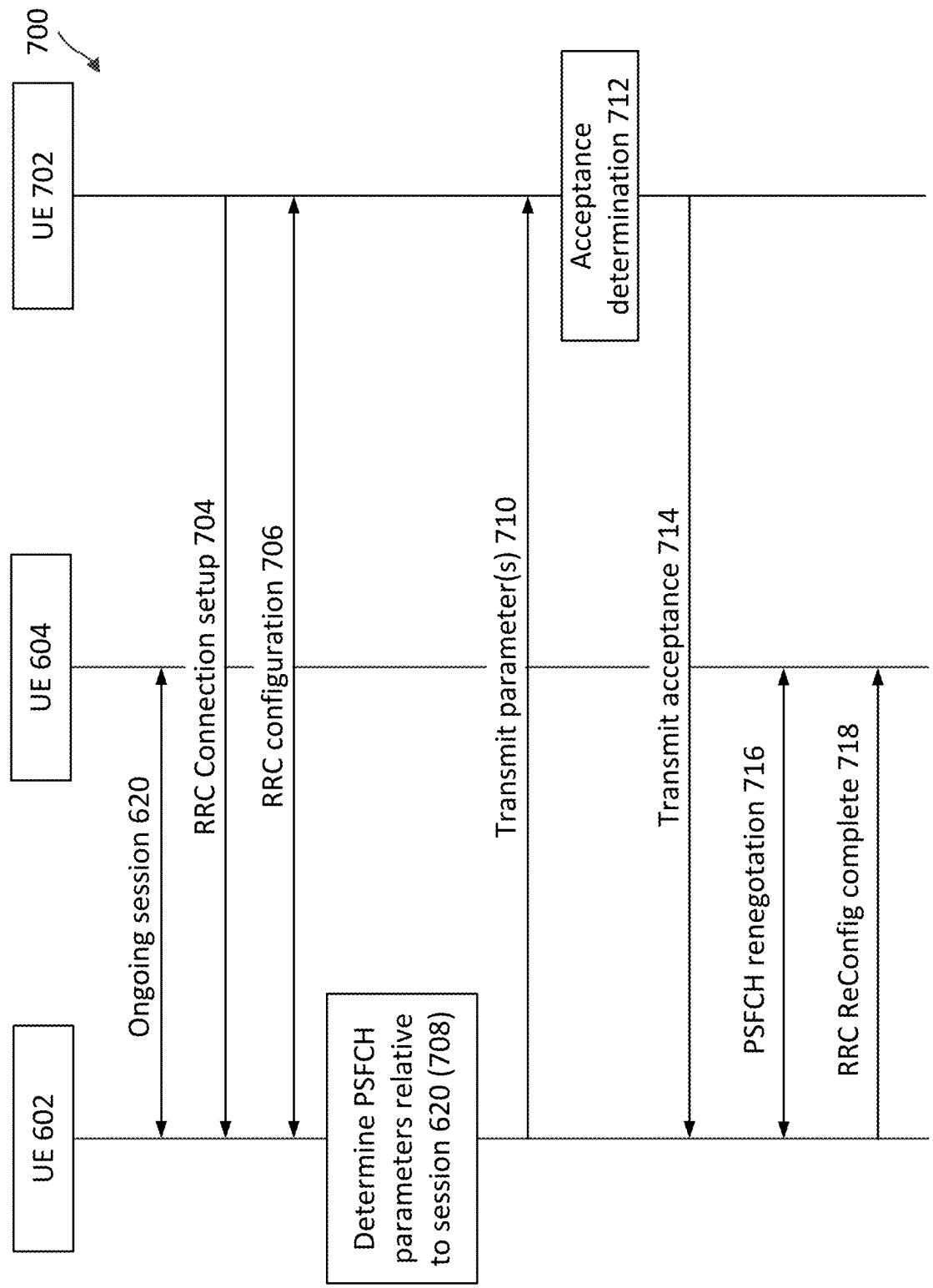
FIG. 7 illustrates a protocol diagram of a sidelink communication and negotiation scheme according to some embodiments of the present disclosure.

As noted previously, in addition to PSFCH negotiation at the setup of a sidelink communication session, according to some embodiments of the present disclosure PSFCH may be renegotiated during a session as other UEs attempt to establish sidelink connections. FIG. 7 illustrates a protocol diagram of a sidelink communication and negotiation scheme 700 according to some embodiments of the present disclosure pertaining to renegotiation. Continuing with the example started in FIG. 6, communication may be between a UE 602 (of which UEs 115, 215, 300 are examples) and a UE 604 (of which UEs 115, 215, and 300 are also examples). Further in FIG. 7, a third UE, UE 702 (of which UEs 115, 215, and 300 are again examples), is representative of additional UEs seeking a sidelink connection with UE 602 while the sidelink communication session from action 620 is ongoing. While illustrated from the perspective of UE 602 providing PSFCH renegotiation information to UE 604 and negotiation with UE 702, the UEs 604 and/or 702 may likewise engage in PSFCH negotiation with the UE 602 and/or one or more other UEs with which sidelink connections exist.

Action 620 from FIG. 6, the ongoing communication session between UE 602 and UE 604 via a sidelink connection, is illustrated in FIG. 7.

At action 704, the UE 702 initiates a connection setup for a sidelink connection with UE 602 (e.g., an RRC connection setup) while the UE 602 itself is still engaged in the ongoing communication session with the UE 604.

At action 706, the UE 702 and the UE 602 engage in sidelink connection configuration, for example RRC configuration. This may, again, include multiple signals transmitted between the UEs 702 and 602 as part of the configuration process.

At action 708, the UE 602 determines one or more PSFCH parameters, taking into consideration the ongoing session with UE 604. This may include the UE 602 comparing the priority of the requested connection from UE 702 with the priority of the existing connection with UE 604 (e.g., priorities of the packets, QoS indicators of the packets, etc.). If the priority of the new connection request with UE 702 exceeds the priority of the existing connection with UE 604, the UE 602 may prioritize PSFCH signaling with the UE 702 over UE 604. This reduces the number of PSFCH signaling opportunities available for the existing connection with UE 604. If the priority of the new connection request with UE 702 does not exceed the priority of the existing connection with UE 604, the UE 602 will take into account the number of available PSFCH signals already allocated for use with UE 604, thereby further reducing the maximum number of PSFCH signals available for use with UE 702 for the newly requested sidelink connection. Thus, the UE 702 may have fewer PSFCH signaling opportunities available to it in view of those already associated with the sidelink communication session with UE 604.

In addition to the comparison, and as a result of the comparison, the UE 602 also determines one or more PSFCH parameters. For example, this may occur concurrent to the configuration process. The UE 602 may determine parameters such as those listed as examples at action 610 of FIG. 6 (e.g., maximum number, priority rules, power allocation, some hierarchy and/or combination of them, etc.).

At action 710, the UE 602 transmits the one or more PSFCH parameters determined at action 708, which also involved comparing the priority of the sidelink connection requested by UE 702 with the existing connections, including in the example of FIG. 7 the sidelink connection with UE 604. The transmission to UE 702 may be explicit or implicit, as discussed above.

At action 712, the UE 702 receives the transmitted PSFCH parameters from UE 602 and processes them, including for example determining whether to accept or decline the connection with the conditions placed by the PSFCH parameters. As part of the acceptance determination, the UE 702 may store the parameters and/or load any rules/actions based on the parameters for use in an ongoing communication session with the UE 602.

At action 714, the UE 702 transmits the acceptance to the UE 602 of the conditions placed on PSFCH by UE 602.

At action 716, the UE 602 initiates PSFCH renegotiation of the sidelink connection with the UE 604 in response to the determination (at action 708) that the priority of the sidelink connection from UE 702 was greater than the priority of the existing, ongoing communication session with UE 604. This may include, for example, an RRC reconfiguration message. As part of this renegotiation, the UE 602 may update the PSFCH configuration parameters (i.e., some combination of the information discussed above) with the UE 604.

At action 718, the UE 602 signals that the reconfiguration is complete with the PSFCH configuration parameters having been updated for the ongoing session with UE 604.

Figure 8:
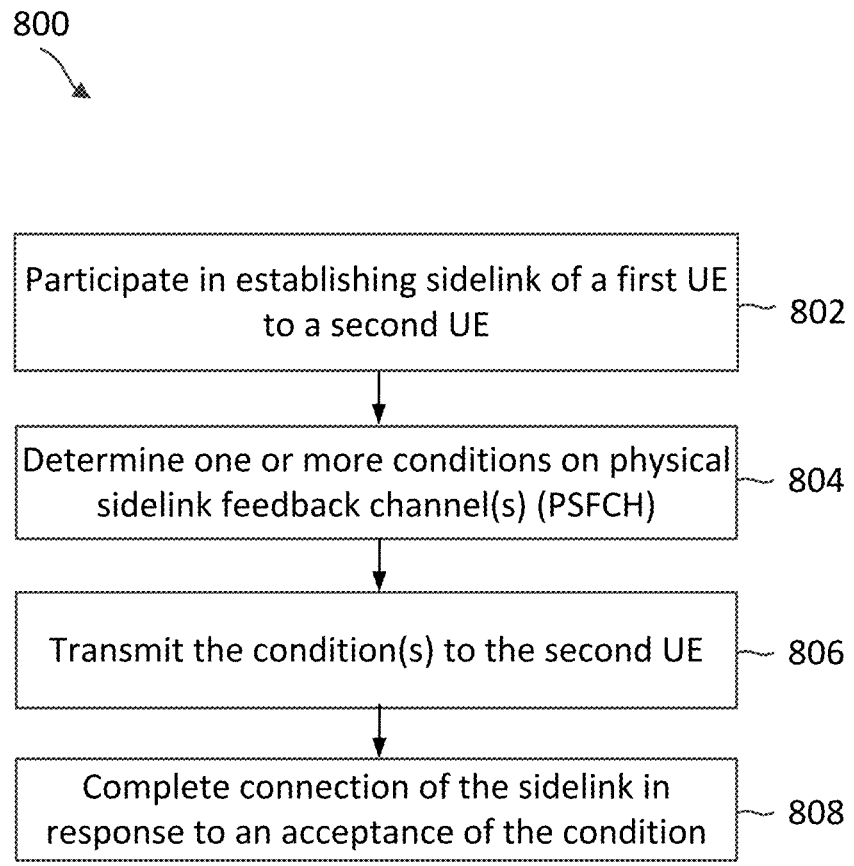
FIG. 8 illustrates a flow diagram of a wireless communication method according to some embodiments of the present disclosure.

FIG. 8 illustrates a flow diagram of a wireless communication method 800 according to some embodiments of the present disclosure. Aspects of the method 800 may be executed by a wireless communication device, such as the UEs 115, 215 and/or 300 utilizing one or more components, such as the processor 302, the memory 304, the sidelink communication module 308, the transceiver 310, the modem 312, the one or more antennas 316, and various combinations thereof. As illustrated, the method 800 includes a number of enumerated steps, but embodiments of the method 800 may include additional steps before, during, after, and in between the enumerated steps. For example, in some instances one or more aspects of methods 900, 1000 may be implemented as part of method 800. Further, in some embodiments, one or more of the enumerated steps may be omitted or performed in a different order.

At block 802, a first UE participates in establishing a sidelink connection with a second UE, for example of UE 602 with UE 604 in the example given with respect to FIG. 6 (and which will be used in describing the example of FIG. 8 for ease of discussion). Establishing of the sidelink connection may include, for example, actions 606 and 608 of FIG. 6 (e.g., connection setup request and connection configuration).

At block 804, the UE 602 determines one or more conditions, or PSFCH parameters, at the UE 602. The UE 602 may determine parameters such as those listed as examples at action 610 of FIG. 6 (e.g., maximum number, priority rules, power allocation, some hierarchy and/or combination of them, etc.).

At block 806, the UE 602 transmits the conditions, or PSFCH parameters, to the second UE (e.g., UE 604 in the example of FIG. 6). This may be transmitted explicitly or implicitly, as discussed with respect to the other figures above.

At block 808, the UE 602 completes configuration of the sidelink connection with the second UE (e.g., UE 604) in response to the UE 604 accepting the conditions relating to PSFCH available for the requested sidelink connection. The two UEs may then engage in sidelink communications, with the second UE (e.g., UE 604) expecting a PSFCH signal with ACK/NACK dependent upon the results of the PSFCH negotiation with the UE 602 (e.g., dependent upon the type of communication session such as unicast or groupcast, power allocation, timing, etc.).

Figure 9:
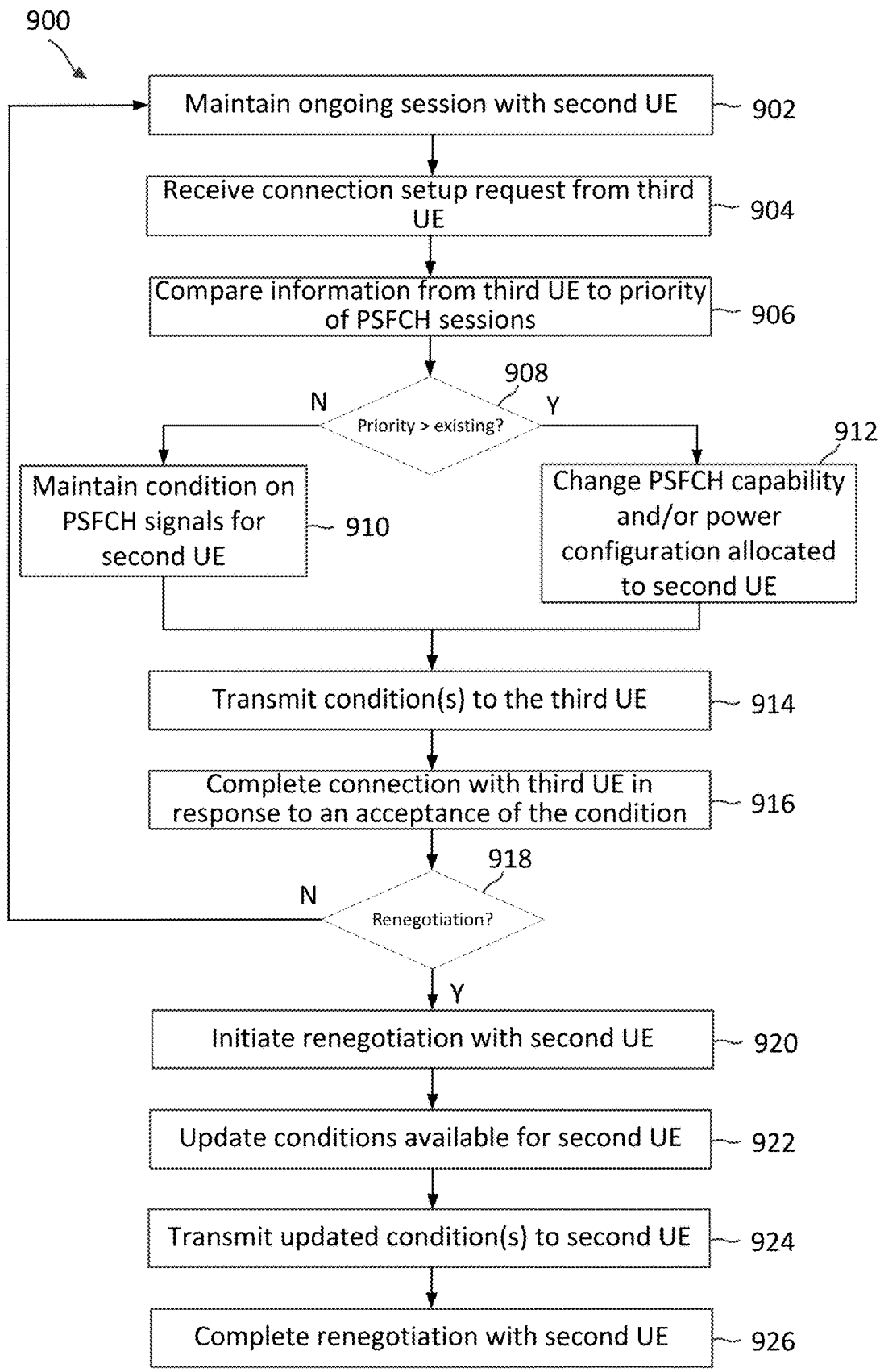
FIG. 9 illustrates a flow diagram of a wireless communication method according to some embodiments of the present disclosure.

Turning now to FIG. 9, illustrated is a flow diagram of a wireless communication method 900 according to some embodiments of the present disclosure. For example, method 900 illustrates a third UE, e.g. UE 702 in the example of FIG. 7 (representative of additional UEs seeking a sidelink connection with a UE that has an ongoing sidelink communication session with one or more other UEs). Aspects of the method 900 may be executed by a wireless communication device, such as the UEs 115, 215 and/or 300 utilizing one or more components, such as the processor 302, the memory 304, the sidelink communication module 308, the transceiver 310, the modem 312, the one or more antennas 316, and various combinations thereof. As illustrated, the method 900 includes a number of enumerated steps, but embodiments of the method 900 may include additional steps before, during, after, and in between the enumerated steps. For example, in some instances one or more aspects of methods 800, 1000 may be implemented as part of method 900. Further, in some embodiments, one or more of the enumerated steps may be omitted or performed in a different order.

At block 902, the first UE maintains an ongoing session with a second UE (e.g., UE 602 with the UE 604 in the examples of FIGS. 6 and 7).

At block 904, the first UE receives a connection setup request from a third UE (e.g., UE 702 in the example of FIG. 7), while the first UE is still maintaining the ongoing session with the second UE.

At block 906, the first UE compares priority information from the third UE to priority information of the existing, ongoing session with the second UE.

At decision block 908, if the priority of the requested connection from the third UE is not greater than the priority of the existing, ongoing session with the second UE, the method 900 proceeds to block 910.

At block 910, the first UE maintains the conditions on the PSFCH signals for the sidelink communication session with the second UE (the ongoing session), instead of renegotiating any parameters.

Returning to decision block 908, if the priority of the requested connection from the third UE is greater than the priority of the existing, ongoing session with the second UE, the method 900 instead proceeds to block 912.

At block 912, the first UE changes the PSFCH capability and/or power configuration allocated to the second UE for the existing, ongoing session, which will make that available for the requested connection with the third UE. From either block 910 or 912, the method 900 proceeds to block 914.

At block 914, the first UE transmits one or more conditions on PSFCH signals, e.g. PSFCH parameters, to the third UE. If the method 900 proceeded from block 910, this includes taking into account the number of available PSFCH signals already allocated for use with the second UE, thereby further reducing the maximum number of PSFCH signals available for use with the third UE for the newly requested sidelink connection. If the method 900 proceeded from block 912, this includes more PSFCH signaling opportunities available for the third UE's requested sidelink connection based on the action taken at block 912.

At block 916, the first UE completes the connection for the requested sidelink connection with the third UE, for example in response to the third UE accepting the PSFCH parameters provided by the first UE in the PSFCH negotiation.

At decision block 918, if renegotiation is not occurring (e.g., because the priority of the requested connection from the third UE is not greater than the priority of the existing, ongoing session with the second UE), then the method 900 returns to block 902 and the first UE maintains its ongoing sessions, now including with the third UE.

If, instead, at decision block 918 renegotiation is occurring (e.g., because the priority of the requested connection from the third UE is greater than the priority of the existing, ongoing session with the second UE), then the method 900 proceeds to block 920.

At block 920, the first UE initiates PSFCH renegotiation with the second UE of the sidelink connection with the second UE. This may include, for example, an RRC reconfiguration message.

At block 922, as part of this renegotiation, the first UE may update the PSFCH configuration parameters (i.e., some combination of the information discussed above) for the second UE.

At block 924, the first UE transmits the updated PSFCH configuration parameters to the second UE.

At block 926, the first UE completes renegotiation with the second UE for the existing, ongoing session, for example in response to the second UE accepting the updated PSFCH configuration parameters provided by the first UE.

Figure 10:
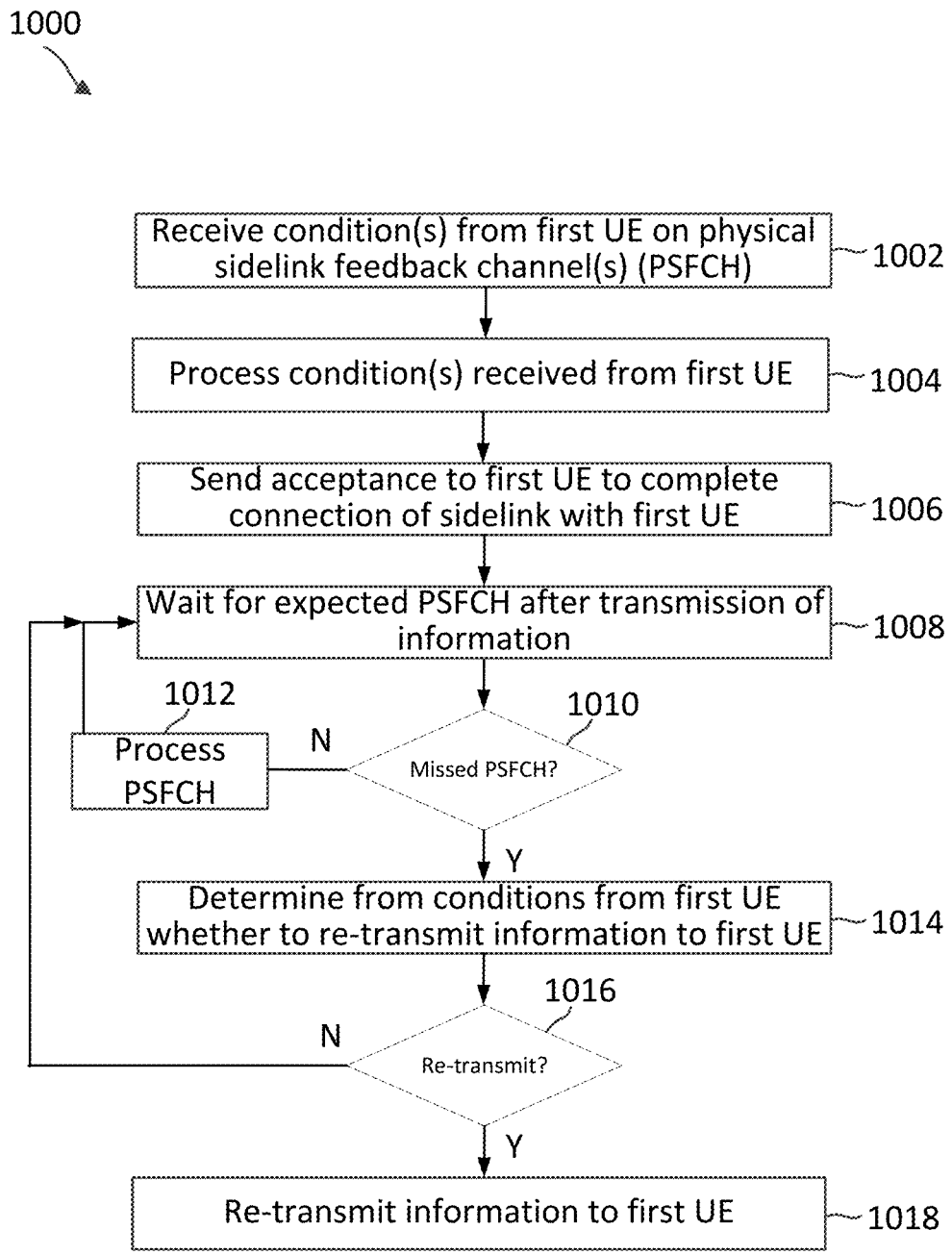
FIG. 10 illustrates a flow diagram of a wireless communication method according to some embodiments of the present disclosure.

FIG. 10 is a flow diagram of a sidelink communication method 1000 according to some aspects of the present disclosure. Aspects of the method 1000 may be executed by a wireless communication device, such as the UEs 115, 215 and/or 300 utilizing one or more components, such as the processor 302, the memory 304, the sidelink communication module 308, the transceiver 310, the modem 312, the one or more antennas 316, and various combinations thereof. As illustrated, the method 1000 includes a number of enumerated steps, but embodiments of the method 1000 may include additional steps before, during, after, and in between the enumerated steps. For example, in some instances one or more aspects of methods 800, 900 may be implemented as part of method 1000, such as before or after, or in conjunction with those aspects. Further, in some embodiments, one or more of the enumerated steps may be omitted or performed in a different order.

At block 1002, a second UE receives one or more conditions, also referred to as PSFCH parameters, from a first UE for a sidelink connection that the first and second UEs are seeking to establish with each other.

At block 1004, the second UE processes the one or more conditions received from the first UE. This may include, for example, the second UE determining whether to accept or decline the conditions on PSFCH. As part of the acceptance determination, the second UE may store the parameters and/or load any rules/actions based on the parameters for use in an ongoing communication session with the first UE.

At block 1006, the second UE sends the acceptance determined at block 1004 to the first UE, to complete the establishment of the sidelink connection between the first and second UEs.

At block 1008, the second UE waits for an expected PSFCH (e.g., HARQ ACK/NACK) from the first UE after the second UE transmits information, such as one or more packets/message, to the first UE.

At decision block 1010, if the second UE has not missed an expected PSFCH (e.g., expected based on the conditions conveyed by the first UE during PSFCH negotiation), then the method 1000 proceeds to block 1012, where the PSFCH is processed (where an ACK/NACK is received or presumed received). For example, the second UE may receive an actual PSFCH signal from the first UE in response to a message sent to the first UE.

From block 1012, the second UE may return to block 1008 to wait for another expected PSFCH signal when a next message is sent from the second UE to the first UE.

Returning to decision block 1010, if the second UE has missed an expected PSFCH, then the method 1000 instead proceeds to block 1014. The second UE may determine that an expected PSFCH is missed based on the PSFCH negotiation, for example during a time period in which the first UE had indicated it may provide a PSFCH signal to the second UE (e.g., because the second UE sent a unicast message that receives priority over groupcast, or it is the $x^{th}$ slot out of y slots, etc.).

At block 1014, the second UE determines from the conditions provided by the first UE during PSFCH negotiation whether to re-transmit the data/message to the first UE. For example, the second UE may make the determination whether to re-transmit based on a power allocation to the expected (and not received) PSFCH signal being greater than a threshold amount, since the power was sufficient that it was likely not sent (instead of being potentially drowned out by channel noise or other interference). As another example, the second UE may not receive an actual PSFCH signal, but still presume receipt. This may occur based on the power allocation being below a threshold amount, since the power was potentially insufficient and drowned out by noise.

At decision block 1016, if the second UE determines from block 1014 not to re-transmit the message, then the method 1000 returns to block 1008 to wait for another expected PSFCH signal when a next message is sent from the second UE to the first UE.

If, instead, at decision block 1016 the second UE has determined to re-transmit the message, then the method 1000 proceeds to block 1018. At block 1018, the second UE re-transmits the message to the first UE, at which point the second UE may again wait for an expected PSFCH based on the conditions established during PSFCH negotiation.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include where the method for wireless communication may also include wherein the priority rule comprises sending PSFCH signals for only highest priority messages. The method may also include wherein the priority rule comprises sending PSFCH signals for only unicast messages. The method may also include wherein the priority rule comprises sending PSFCH signals for only groupcast messages. The method may also include wherein the priority rule comprises multiplexing the maximum number of PSFCH signals to different connection types on a per-slot basis according to a connection type ratio. The method may also include wherein the connection types comprise a groupcast message type and a unicast message type between the first UE and the second UE. The method may also include wherein the connection type comprises first messages between the first UE and the second UE, and second messages between the first UE and a third UE. The method may also include wherein the sidelink comprises a first sidelink, the first UE and the second UE further having a second sidelink, the method further comprising splitting, by the first UE, a total amount of transmit power available at the first UE between a first transmit power for the first sidelink and a second transmit power for the second sidelink. The method may also include wherein the splitting is based on a relative priority of the first sidelink to the second sidelink. The method may also include wherein the first transmit power indicates to the second UE whether to expect a first PSFCH signal from the first UE for the first sidelink and the second transmit power indicates to the second UE whether to expect a second PSFCH signal from the first UE for the second sidelink.

Further embodiments of the present disclosure include a method for wireless communication comprising participating, by a first user equipment (UE), in establishing a sidelink with a second UE; receiving, by the first UE, a condition on physical sidelink feedback channel (PSFCH) signals available at the second UE for the first UE, the condition being based on a number of existing sidelinks at the second UE; and sending, by the first UE, an acceptance of the condition to the second UE to complete the sidelink.

The method may also include wherein the condition comprises a maximum number of PSFCH signals available for the first UE. The method may also include wherein the condition comprises a priority rule that the second UE will follow if a number of sidelinks with the first UE exceeds a maximum number of PSFCH signals available for the first UE. The method may also include wherein the priority rule comprises sending PSFCH signals for only highest priority messages. The method may also include wherein the priority rule comprises sending PSFCH signals for only unicast messages. The method may also include wherein the priority rule comprises sending PSFCH signals for only groupcast messages. The method may also include wherein the priority rule comprises multiplexing the maximum number of PSFCH signals to different connection types on a per-slot basis according to a connection type ratio. The method may also include wherein the connection types comprise a groupcast message type and a unicast message type between the first UE and the second UE. The method may also include wherein the connection type comprises first messages between the first UE and the second UE, and second messages between the second UE and a third UE. The method may also include wherein the condition comprises a power allocation by the second UE for the sidelink. The method may also include determining, by the first UE, to re-transmit a message to the second UE in response to not receiving a PSFCH signal based on the power allocation being greater than a threshold; and determining, by the first UE, to not re-transmit the message to the second UE in response to not receiving the PSFCH signal based on the power allocation being less than the threshold. The method may also include wherein the condition comprises a combination of a maximum number of PSFCH signals available for the first UE, a priority rule that the second UE will follow if a number of sidelinks with the first UE exceeds the maximum number of PSFCH signals available for the first UE, and a power allocation by the second UE for the sidelink. The method may also include receiving, by the first UE, a renegotiation request from the second UE in response to a priority of a sidelink request from a third UE to the second UE being greater than a priority of the sidelink between the first UE and the second UE.

Further embodiments of the present disclosure include a user equipment (UE) comprising a transceiver configured to participate in establishing a sidelink with a second UE; receive a condition on physical sidelink feedback channel (PSFCH) signals available at the second UE for the UE, the condition being based on a number of existing sidelinks at the second UE; and send an acceptance of the condition to the second UE to complete the sidelink.

The UE may also include wherein the condition comprises a maximum number of PSFCH signals available for the UE. The UE may also include wherein the condition comprises a priority rule that the second UE will follow if a number of sidelinks with the UE exceeds a maximum number of PSFCH signals available for the UE. The UE may also include wherein the priority rule comprises sending PSFCH signals for only highest priority messages. The UE may also include wherein the priority rule comprises sending PSFCH signals for only unicast messages. The UE may also include wherein the priority rule comprises sending PSFCH signals for only groupcast messages. The UE may also include wherein the priority rule comprises multiplexing the maximum number of PSFCH signals to different connection types on a per-slot basis according to a connection type ratio. The UE may also include wherein the connection types comprise a groupcast message type and a unicast message type between the UE and the second UE. The UE may also include wherein the connection type comprises first messages between the UE and the second UE, and second messages between the second UE and a third UE. The UE may also include wherein the condition comprises a power allocation by the second UE for the sidelink. The UE may also include further comprising a processor configured to determine to re-transmit a message to the second UE in response to not receiving a PSFCH signal based on the power allocation being greater than a threshold; and determine to not re-transmit the message to the second UE in response to not receiving the PSFCH signal based on the power allocation being less than the threshold. The UE may also include wherein the condition comprises a combination of a maximum number of PSFCH signals available for the UE, a priority rule that the second UE will follow if a number of sidelinks with the UE exceeds the maximum number of PSFCH signals available for the UE, and a power allocation by the second UE for the sidelink. The UE may also include wherein the transceiver is further configured to receive a renegotiation request from the second UE in response to a priority of a sidelink request from a third UE to the second UE being greater than a priority of the sidelink between the UE and the second UE.

Further embodiments of the present disclosure include a non-transitory computer-readable medium having program code recorded thereon, the program code comprising code for causing a first user equipment (UE) to participate in establishing a sidelink with a second UE; code for causing the first UE to transmit, based on a number of existing sidelinks at the first UE, a condition on physical sidelink feedback channel (PSFCH) signals available for the second UE; and code for causing the first UE to complete, from the second UE, the sidelink in response to receiving an acceptance of the condition.

The non-transitory computer-readable medium may also include wherein the condition comprises a maximum number of PSFCH signals available for the second UE. The non-transitory-computer readable medium may also include the code further comprising code for causing the first UE to compare a priority of the sidelink with the second UE to priorities of any existing sidelinks by the first UE; and code for causing the first UE to determine the maximum number of PSFCH signals available for the second UE based on the comparing. The non-transitory computer-readable medium may also include wherein the condition comprises a priority rule that the first UE will follow if a number of sidelinks with the second UE exceeds a maximum number of PSFCH signals available for the second UE. The non-transitory computer-readable medium may also include wherein the priority rule comprises sending PSFCH signals for only highest priority messages. The non-transitory computer-readable medium may also include wherein the priority rule comprises sending PSFCH signals for only unicast messages. The non-transitory computer-readable medium may also include wherein the priority rule comprises sending PSFCH signals for only groupcast messages. The non-transitory computer-readable medium may also include wherein the priority rule comprises multiplexing the maximum number of PSFCH signals to different connection types on a per-slot basis according to a connection type ratio. The non-transitory computer-readable medium may also include wherein the connection types comprise a groupcast message type and a unicast message type between the first UE and the second UE. The non-transitory computer-readable medium may also include wherein the connection type comprises first messages between the first UE and the second UE, and second messages between the first UE and a third UE. The non-transitory computer-readable medium may also include wherein the condition comprises a power allocation by the first UE for the sidelink. The non-transitory computer-readable medium may also include wherein the sidelink comprises a first sidelink, the first UE and the second UE further having a second sidelink, the program code further comprising code for causing the first UE to split a total amount of transmit power available at the first UE between a first transmit power for the first sidelink and a second transmit power for the second sidelink. The non-transitory computer-readable medium may also include wherein the split is based on a relative priority of the first sidelink to the second sidelink. The non-transitory computer-readable medium may also include wherein the first transmit power indicates to the second UE whether to expect a first PSFCH signal from the first UE for the first sidelink and the second transmit power indicates to the second UE whether to expect a second PSFCH signal from the first UE for the second sidelink. The non-transitory computer-readable medium may also include wherein the condition comprises a combination of a maximum number of PSFCH signals available for the second UE, a priority rule that the first UE will follow if a number of sidelinks with the second UE exceeds the maximum number of PSFCH signals available for the second UE, and a power allocation by the first UE for the sidelink. The non-transitory computer-readable medium may also include wherein the code for causing the transmission further comprises code for causing the first UE to include, with the condition, an explicit indication of whether the first UE will transmit a PSFCH signal for the sidelink. The non-transitory computer-readable medium may also include wherein the sidelink comprises a first sidelink, the code further comprising code for causing the first UE to receive a request to establish a second sidelink with a third UE; code for causing the first UE to compare a priority of the second sidelink to a priority of the first sidelink; and code for causing the first UE to complete, with the third UE, the second sidelink based on the comparing. The non-transitory computer-readable medium may also include wherein the code for causing the completing the second sidelink further comprises code for causing the first UE to initiate a renegotiation with the second UE based on the priority of the second sidelink being greater than the priority of the first sidelink; and code for causing the first UE to update, during the renegotiation, the condition on the PSFCH signals available for the second UE. The non-transitory computer-readable medium may also include wherein the code for causing the completing the second sidelink further comprises code for causing the first UE to maintain the condition on PSFCH signals available for the second UE based on priority of the second sidelink being less than the priority of the first sidelink; and code for causing the first UE to transmit, to the third UE, a condition on PSFCH signals available for the third UE that takes into account the condition on PSFCH signals available for the second UE.

Further embodiments of the present disclosure include a non-transitory computer-readable medium having program code recorded thereon, the program code comprising code for causing a first user equipment (UE) to participate in establishing a sidelink with a second UE; code for causing the first UE to receive a condition on physical sidelink feedback channel (PSFCH) signals available at the second UE for the first UE, the condition being based on a number of existing sidelinks at the second UE; and code for causing the first UE to send an acceptance of the condition to the second UE to complete the sidelink.

The non-transitory computer-readable medium may also include wherein the condition comprises a maximum number of PSFCH signals available for the first UE. The non-transitory computer-readable medium may also include wherein the condition comprises a priority rule that the second UE will follow if a number of sidelinks with the first UE exceeds a maximum number of PSFCH signals available for the first UE. The non-transitory computer-readable medium may also include wherein the priority rule comprises sending PSFCH signals for only highest priority messages. The non-transitory computer-readable medium may also include wherein the priority rule comprises sending PSFCH signals for only unicast messages. The non-transitory computer-readable medium may also include wherein the priority rule comprises sending PSFCH signals for only groupcast messages. The non-transitory computer-readable medium may also include wherein the priority rule comprises multiplexing the maximum number of PSFCH signals to different connection types on a per-slot basis according to a connection type ratio. The non-transitory computer-readable medium may also include wherein the connection types comprise a groupcast message type and a unicast message type between the first UE and the second UE. The non-transitory computer-readable medium may also include wherein the connection type comprises first messages between the first UE and the second UE, and second messages between the second UE and a third UE. The non-transitory computer-readable medium may also include wherein the condition comprises a power allocation by the second UE for the sidelink. The non-transitory computer-readable medium may also include the code further comprising code for causing the first UE to determine to re-transmit a message to the second UE in response to not receiving a PSFCH signal based on the power allocation being greater than a threshold; and code for causing the first UE to determine to not re-transmit the message to the second UE in response to not receiving the PSFCH signal based on the power allocation being less than the threshold. The non-transitory computer-readable medium may also include wherein the condition comprises a combination of a maximum number of PSFCH signals available for the first UE, a priority rule that the second UE will follow if a number of sidelinks with the first UE exceeds the maximum number of PSFCH signals available for the first UE, and a power allocation by the second UE for the sidelink. The non-transitory computer-readable medium may also include the code further comprising code for causing the first UE to receive a renegotiation request from the second UE in response to a priority of a sidelink request from a third UE to the second UE being greater than a priority of the sidelink between the first UE and the second UE.

Further embodiments of the present disclosure include a user equipment (UE) comprising means for participating in establishing a sidelink with a second UE; means for transmitting, based on a number of existing sidelinks at the UE, a condition on physical sidelink feedback channel (PSFCH) signals available for the second UE; and means for completing, from the second UE, the sidelink in response to receiving an acceptance of the condition.

The UE may also include wherein the condition comprises a maximum number of PSFCH signals available for the second UE. The UE may also include means for comparing a priority of the sidelink with the second UE to priorities of any existing sidelinks by the UE; and means for determining the maximum number of PSFCH signals available for the second UE based on the comparing. The UE may also include wherein the condition comprises a priority rule that the UE will follow if a number of sidelinks with the second UE exceeds a maximum number of PSFCH signals available for the second UE. The UE may also include wherein the priority rule comprises sending PSFCH signals for only highest priority messages. The UE may also include wherein the priority rule comprises sending PSFCH signals for only unicast messages. The UE may also include wherein the priority rule comprises sending PSFCH signals for only groupcast messages. The UE may also include wherein the priority rule comprises multiplexing the maximum number of PSFCH signals to different connection types on a per-slot basis according to a connection type ratio. The UE may also include wherein the connection types comprise a groupcast message type and a unicast message type between the UE and the second UE. The UE may also include wherein the connection type comprises first messages between the UE and the second UE, and second messages between the UE and a third UE. The UE may also include wherein the condition comprises a power allocation by the UE for the sidelink. The UE may also include wherein the sidelink comprises a first sidelink, the UE and the second UE further having a second sidelink, further comprising means for splitting a total amount of transmit power available at the UE between a first transmit power for the first sidelink and a second transmit power for the second sidelink. The UE may also include wherein the split is based on a relative priority of the first sidelink to the second sidelink. The UE may also include wherein the first transmit power indicates to the second UE whether to expect a first PSFCH signal from the UE for the first sidelink and the second transmit power indicates to the second UE whether to expect a second PSFCH signal from the UE for the second sidelink. The UE may also include wherein the condition comprises a combination of a maximum number of PSFCH signals available for the second UE, a priority rule that the UE will follow if a number of sidelinks with the second UE exceeds the maximum number of PSFCH signals available for the second UE, and a power allocation by the UE for the sidelink. The UE may also include wherein the means for transmitting further comprises means for including, with the condition, an explicit indication of whether the UE will transmit a PSFCH signal for the sidelink. The UE may also include wherein the sidelink comprises a first sidelink, the user equipment further comprising means for receiving a request to establish a second sidelink with a third UE; means for comparing a priority of the second sidelink to a priority of the first sidelink; and means for completing, with the third UE, the second sidelink based on the comparison. The UE may also include wherein the means for completing the second sidelink further comprises means for initiating a renegotiation with the second UE based on the priority of the second sidelink being greater than the priority of the first sidelink; and means for updating, during the renegotiation, the condition on the PSFCH signals available for the second UE. The UE may also include wherein the means for completing the second sidelink further comprises means for maintaining the condition on PSFCH signals available for the second UE based on priority of the second sidelink being less than the priority of the first sidelink; and means for transmitting, to the third UE, a condition on PSFCH signals available for the third UE that takes into account the condition on PSFCH signals available for the second UE.

Further embodiments of the present disclosure include a user equipment (UE) comprising means for participating in establishing a sidelink with a second UE; means for receiving a condition on physical sidelink feedback channel (PSFCH) signals available at the second UE for the UE, the condition being based on a number of existing sidelinks at the second UE; and means for sending an acceptance of the condition to the second UE to complete the sidelink.

The UE may also include wherein the condition comprises a maximum number of PSFCH signals available for the UE. The UE may also include wherein the condition comprises a priority rule that the second UE will follow if a number of sidelinks with the UE exceeds a maximum number of PSFCH signals available for the UE. The UE may also include wherein the priority rule comprises sending PSFCH signals for only highest priority messages. The UE may also include wherein the priority rule comprises sending PSFCH signals for only unicast messages. The UE may also include wherein the priority rule comprises sending PSFCH signals for only groupcast messages. The UE may also include wherein the priority rule comprises multiplexing the maximum number of PSFCH signals to different connection types on a per-slot basis according to a connection type ratio. The UE may also include wherein the connection types comprise a groupcast message type and a unicast message type between the UE and the second UE. The UE may also include wherein the connection type comprises first messages between the UE and the second UE, and second messages between the second UE and a third UE. The UE may also include wherein the condition comprises a power allocation by the second UE for the sidelink. The UE may also include means for determining to re-transmit a message to the second UE in response to not receiving a PSFCH signal based on the power allocation being greater than a threshold; and means for determining to not re-transmit the message to the second UE in response to not receiving the PSFCH signal based on the power allocation being less than the threshold. The UE may also include wherein the condition comprises a combination of a maximum number of PSFCH signals available for the UE, a priority rule that the second UE will follow if a number of sidelinks with the UE exceeds the maximum number of PSFCH signals available for the UE, and a power allocation by the second UE for the sidelink. The UE may also include means for receiving a renegotiation request from the second UE in response to a priority of a sidelink request from a third UE to the second UE being greater than a priority of the sidelink between the UE and the second UE.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication comprising:
  transmitting, by a first user equipment (UE), a connection request message for use in establishing a sidelink with a second UE;
  transmitting, by the first UE based on a number of existing sidelinks at the first UE, an indication of a parameter imposed on physical sidelink feedback channel (PSFCH) signals available for the second UE, the parameter comprising a maximum number of PSFCH signals available for the second UE; and
  communicating, by the first UE, with the second UE on the sidelink in response to receiving an acceptance of the parameter from the second UE.

2. The method of claim 1, further comprising:
comparing, by the first UE, a priority of the sidelink with the second UE to priorities of any existing sidelinks by the first UE; and
determining, by the first UE, the maximum number of PSFCH signals available for the second UE based on the comparing.

3. The method of claim 1, wherein the parameter further comprises a priority rule that the first UE will follow if a number of sidelinks with the second UE exceeds a maximum number of PSFCH signals available for the second UE.

4. The method of claim 1, wherein the parameter further comprises a power allocation by the first UE for the sidelink.

5. The method of claim 1, wherein the parameter comprises a combination of the maximum number of PSFCH signals available for the second UE, a priority rule that the first UE will follow if a number of sidelinks with the second UE exceeds the maximum number of PSFCH signals available for the second UE, and a power allocation by the first UE for the sidelink.

6. The method of claim 1, wherein the transmitting further comprises:
including, by the first UE with the parameter, an explicit indication of whether the first UE will transmit a PSFCH signal for the sidelink.

7. The method of claim 1, wherein the sidelink comprises a first sidelink, the method further comprising:
receiving, by the first UE, a request to establish a second sidelink with a third UE;
comparing, by the first UE, a priority of the second sidelink to a priority of the first sidelink; and
communicating, by the first UE, with the third UE on the second sidelink based on the comparing.

8. A method of wireless communication comprising:
receiving, by a first user equipment (UE) in communication with a second UE via a first sidelink based on a parameter imposed on physical sidelink feedback channel (PSFCH) signals available for the second UE, a request to establish a second sidelink with a third UE, the parameter comprising a maximum number of PSFCH signals available for the second UE;
comparing, by the first UE in response to receiving the request to establish the second sidelink, a priority of the second sidelink to a priority of the first sidelink; and
communicating, by the first UE, with the third UE on the second sidelink based on the comparing.

9. The method of claim 8, wherein the communicating with the third UE on the second sidelink further comprises:
initiating, by the first UE, a renegotiation with the second UE based on the priority of the second sidelink being greater than the priority of the first sidelink; and
updating, by the first UE during the renegotiation, the parameter imposed on the PSFCH signals available for the second UE.

10. The method of claim 8, wherein the communicating with the third UE on the second sidelink further comprises:
maintaining, by the first UE, the parameter imposed on the PSFCH signals available for the second UE based on the priority of the second sidelink being less than the priority of the first sidelink; and
transmitting, by the first UE to the third UE, a second parameter imposed on PSFCH signals available for the third UE that takes into account the parameter imposed on PSFCH signals available for the second UE.

11. The method of claim 8, further comprising:
determining, by the first UE, the maximum number of PSFCH signals available for the third UE based on the comparing.

12. The method of claim 8, wherein the parameter further comprises a priority rule that the first UE will follow if a number of sidelinks with the second UE exceeds a maximum number of PSFCH signals available for the second UE.

13. The method of claim 8, wherein the parameter further comprises a power allocation by the first UE for the first sidelink.

14. A user equipment (UE) comprising:
a transceiver configured to transmit a connection request message for use in establishing a sidelink with a second UE; and
a processor configured to determine a parameter imposed on physical sidelink feedback channel (PSFCH) signals available for the second UE based on a number of existing sidelinks at the UE, the parameter comprises a maximum number of PSFCH signals available for the second UE,
wherein the transceiver is further configured to:
transmit an indication of the parameter to the second UE; and
communicate with the second UE on the sidelink in response to receipt of an acceptance of the parameter from the second UE.

15. The user equipment of claim 14, wherein the processor is further configured to:
compare a priority of the sidelink with the second UE to priorities of any existing sidelinks by the UE; and
determine the maximum number of PSFCH signals available for the second UE based on the comparison.

16. The user equipment of claim 14, wherein the parameter further comprises a priority rule that the UE will follow if a number of sidelinks with the second UE exceeds a maximum number of PSFCH signals available for the second UE.

17. The user equipment of claim 14, wherein the parameter further comprises a power allocation by the UE for the sidelink.

18. The user equipment of claim 14, wherein the parameter comprises a combination of the maximum number of PSFCH signals available for the second UE, a priority rule that the UE will follow if a number of sidelinks with the second UE exceeds the maximum number of PSFCH signals available for the second UE, and a power allocation by the UE for the sidelink.

19. The user equipment of claim 14, wherein the transceiver is further configured to:
include, with the parameter, an explicit indication of whether the UE will transmit a PSFCH signal for the sidelink.

20. The user equipment of claim 14, wherein:
the sidelink comprises a first sidelink;
the transceiver is further configured to receive a request to establish a second sidelink with a third UE; and
the processor is further configured to:
compare a priority of the second sidelink to a priority of the first sidelink; and
communicate with the third UE on the second sidelink based on the comparison.

21. A first user equipment (UE) comprising:
a transceiver, in communication with a second UE via a first sidelink based on a parameter imposed on physical sidelink feedback channel (PSFCH) signals available for the second UE, configured to receive a request to establish a second sidelink with a third UE, the parameter comprising a maximum number of PSFCH signals available for the second UE; and
a processor configured to compare, in response to receipt of the request to establish the second sidelink, a priority of the second sidelink to a priority of the first sidelink,
wherein the transceiver is further configured to communicate with the third UE on the second sidelink based on the comparison.

22. The first user equipment of claim 21, wherein the transceiver is further configured, as part of the communicating with the third UE on the second sidelink, to:
initiate a renegotiation with the second UE based on the priority of the second sidelink being greater than the priority of the first sidelink; and
update, during the renegotiation, the parameter imposed on the PSFCH signals available for the second UE.

23. The first user equipment of claim 21, wherein the transceiver is further configured, as part of the communicating with the third UE on the second sidelink, to:
maintain the parameter imposed on the PSFCH signals available for the second UE based on the priority of the second sidelink being less than the priority of the first sidelink; and
transmit, to the third UE, a second parameter imposed on PSFCH signals available for the third UE that takes into account the parameter imposed on PSFCH signals available for the second UE.

24. The first user equipment of claim 21, wherein the processor is further configured to:
determine the maximum number of PSFCH signals available for the third UE based on the comparison.

25. The first user equipment of claim 21, wherein the parameter further comprises a priority rule that the first UE will follow if a number of sidelinks with the second UE exceeds a maximum number of PSFCH signals available for the second UE.

26. The first user equipment of claim 21, wherein the parameter further comprises a power allocation by the first UE for the first sidelink.

* * * * *